US012435671B2

United States Patent
Wood et al.

(10) Patent No.: US 12,435,671 B2
(45) Date of Patent: Oct. 7, 2025

(54) CIRCUMFERENTIALLY VARYING FAN CASING TREATMENTS FOR REDUCING FAN NOISE EFFECTS

(71) Applicant: General Electric Company, Schenectady, NY (US)

(72) Inventors: Trevor Howard Wood, Clifton Park, NY (US); Ramakrishna Venkata Mallina, Mason, OH (US); Giridhar Jothiprasad, Clifton Park, NY (US); Kishore Ramakrishnan, Rexford, NY (US); Thomas Malkus, Albany, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/824,999

(22) Filed: Sep. 5, 2024

(65) Prior Publication Data

US 2024/0426247 A1 Dec. 26, 2024

Related U.S. Application Data

(63) Continuation of application No. 17/958,549, filed on Oct. 3, 2022, now Pat. No. 12,092,034.

(51) Int. Cl.
*F02C 7/24* (2006.01)
*F01D 11/08* (2006.01)
(Continued)

(52) U.S. Cl.
CPC .............. *F02C 7/24* (2013.01); *F01D 11/08* (2013.01); *F02C 3/06* (2013.01); *F02C 7/045* (2013.01);
(Continued)

(58) Field of Classification Search
CPC .... F02C 7/24; F02C 7/045; F02C 3/06; F05D 2260/96; B64D 2033/0206
See application file for complete search history.

(56) References Cited

U.S. PATENT DOCUMENTS 3,194,487 A * 7/1965 Tyler ...................... F02C 7/045
415/199.5
3,821,999 A * 7/1974 Guess .................. G10K 11/172
428/116
(Continued)

FOREIGN PATENT DOCUMENTS

GB      2471845 A      1/2011

OTHER PUBLICATIONS

Lemke, et al., Active Reduction of the Rotational Sound of an Axial Fan Stage by Means of Compressed Air Injection into the Blade Tip Area (Aktive Minderung des Drehklangs einer axialen Fanstufe mittels Druckluftenblasung in den Blattspitzenbereich), Berlin, 2014, 163 Pages. No Translation Available. Retrieved Jan. 6, 2022 from https://www.depositonce_tu-berlin.de/bitstream/11303/4417/2/lemke_olaf.pdf.
(Continued)

*Primary Examiner* — Eldon T Brockman
(74) *Attorney, Agent, or Firm* — Dority & Manning, P.A.

(57) ABSTRACT

A rotary component for a gas turbine engine includes a plurality of rotor blades operably coupled to a rotating shaft extending along the central axis and an outer casing arranged exterior to the plurality of rotor blades in a radial direction of the gas turbine engine. The outer casing defines a gap between a blade tip of each of the plurality of rotor blades and the outer casing. The outer casing includes a plurality of features formed into an interior surface thereof. Each of the plurality of features includes one or more design parameters that are perturbed about a mean design parameter for stall performance so as to provide a circumferential
(Continued)

variation in wake strengths associated with the plurality of rotor blades, thereby reducing operational noise of the gas turbine engine.

12 Claims, 19 Drawing Sheets

(51) Int. Cl.
  *F02C 3/06* (2006.01)
  *F02C 7/045* (2006.01)
(52) U.S. Cl.
  CPC .... *F05D 2240/14* (2013.01); *F05D 2250/184* (2013.01); *F05D 2260/96* (2013.01)

(56) References Cited

U.S. PATENT DOCUMENTS

| | | | |
|---|---|---|---|
| 3,937,590 A * | 2/1976 | Mani | F02C 7/045 |
| | | | 181/207 |
| 5,707,206 A | 1/1998 | Goto et al. | |
| 6,409,469 B1 * | 6/2002 | Tse | F02C 7/045 |
| | | | 415/115 |
| 6,742,983 B2 | 6/2004 | Schmuecker | |
| 6,935,833 B2 | 8/2005 | Seitz | |
| 7,186,072 B2 | 3/2007 | Seitz | |
| 7,210,905 B2 | 5/2007 | Lapworth | |
| 7,645,121 B2 | 1/2010 | Tudor | |
| 7,658,592 B1 | 2/2010 | Jarrah et al. | |
| 7,811,049 B2 | 10/2010 | Xu | |
| 8,066,471 B2 | 11/2011 | Bayere et al. | |
| 8,100,629 B2 | 1/2012 | Lebret | |
| 8,251,648 B2 | 8/2012 | Johann | |
| 8,550,768 B2 | 10/2013 | Montgomery | |
| 8,777,558 B2 | 7/2014 | Brunet et al. | |
| 8,939,705 B1 | 1/2015 | Lee et al. | |
| 9,546,602 B2 * | 1/2017 | Julliard | G10K 11/168 |
| 10,024,336 B2 | 7/2018 | Obrecht et al. | |
| 10,047,620 B2 | 8/2018 | Giacche et al. | |
| 10,107,307 B2 | 10/2018 | Urac et al. | |
| 10,539,152 B2 | 1/2020 | Springer et al. | |
| 10,823,194 B2 | 11/2020 | Jothiprasad et al. | |
| 10,914,318 B2 | 2/2021 | Capozzi et al. | |
| 2006/0169532 A1 * | 8/2006 | Patrick | F04D 29/665 |
| | | | 181/210 |
| 2015/0369127 A1 * | 12/2015 | Gilson | F01D 25/24 |
| | | | 415/119 |
| 2017/0328377 A1 | 11/2017 | Mallina et al. | |
| 2019/0331134 A1 | 10/2019 | Kushner | |
| 2021/0108653 A1 | 4/2021 | Tweedt et al. | |

OTHER PUBLICATIONS

Steger et al., Turbofan Tone Noise Reduction by Flow-Induced Unsteady Blade Forces, Active Flow Control II, Notes on Numerical Fluid Mechanics and Multidisciplinary Design, vol. 108, Berlin, Heidelberg, 2010, pp. 157-170. (Abstract Only). https://link.springer.com/chapter/10.1007/978-3-642-11735-0_11.

* cited by examiner

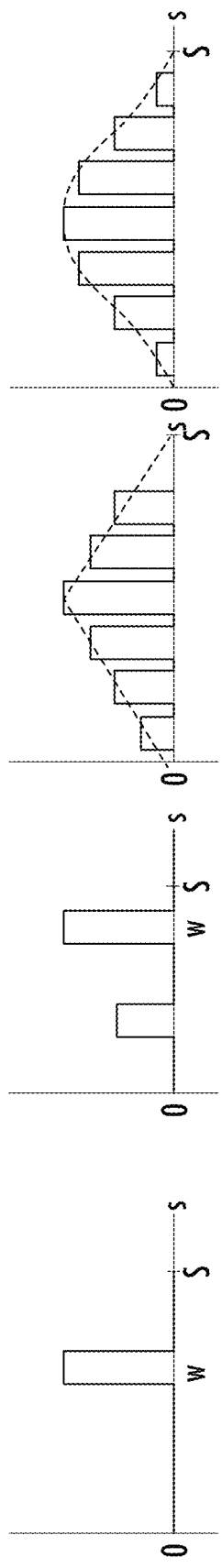
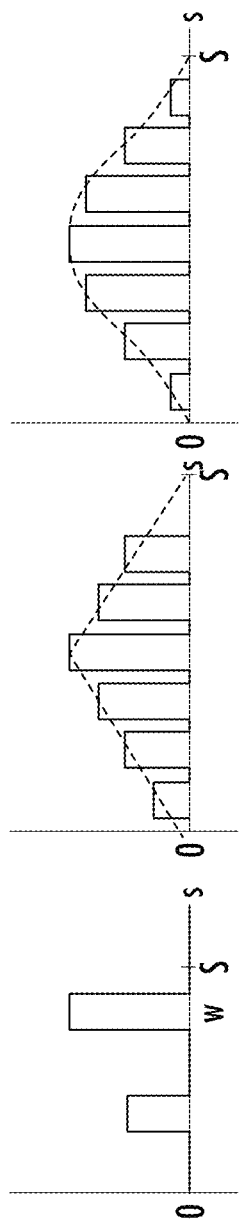
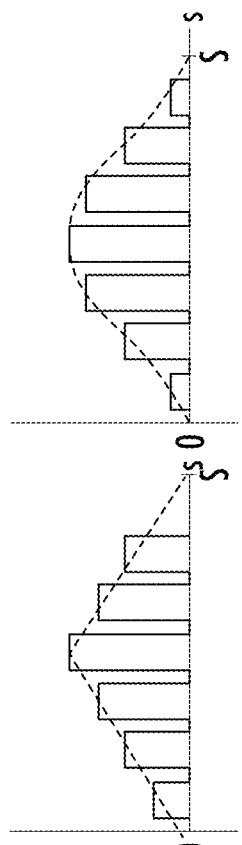
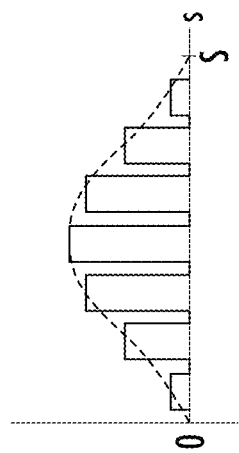
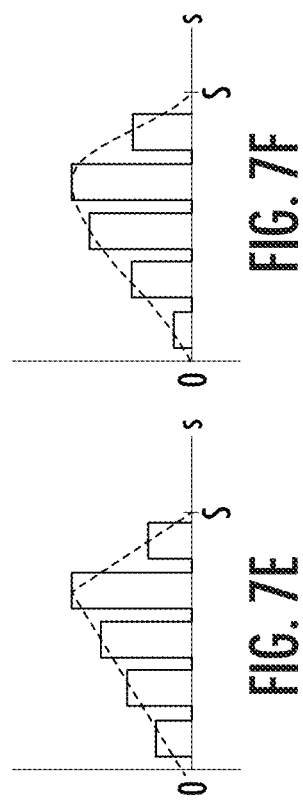
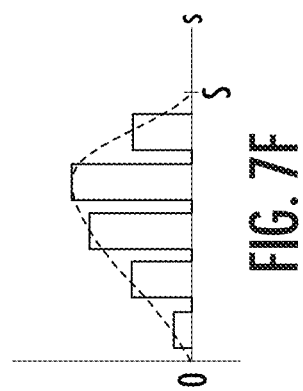

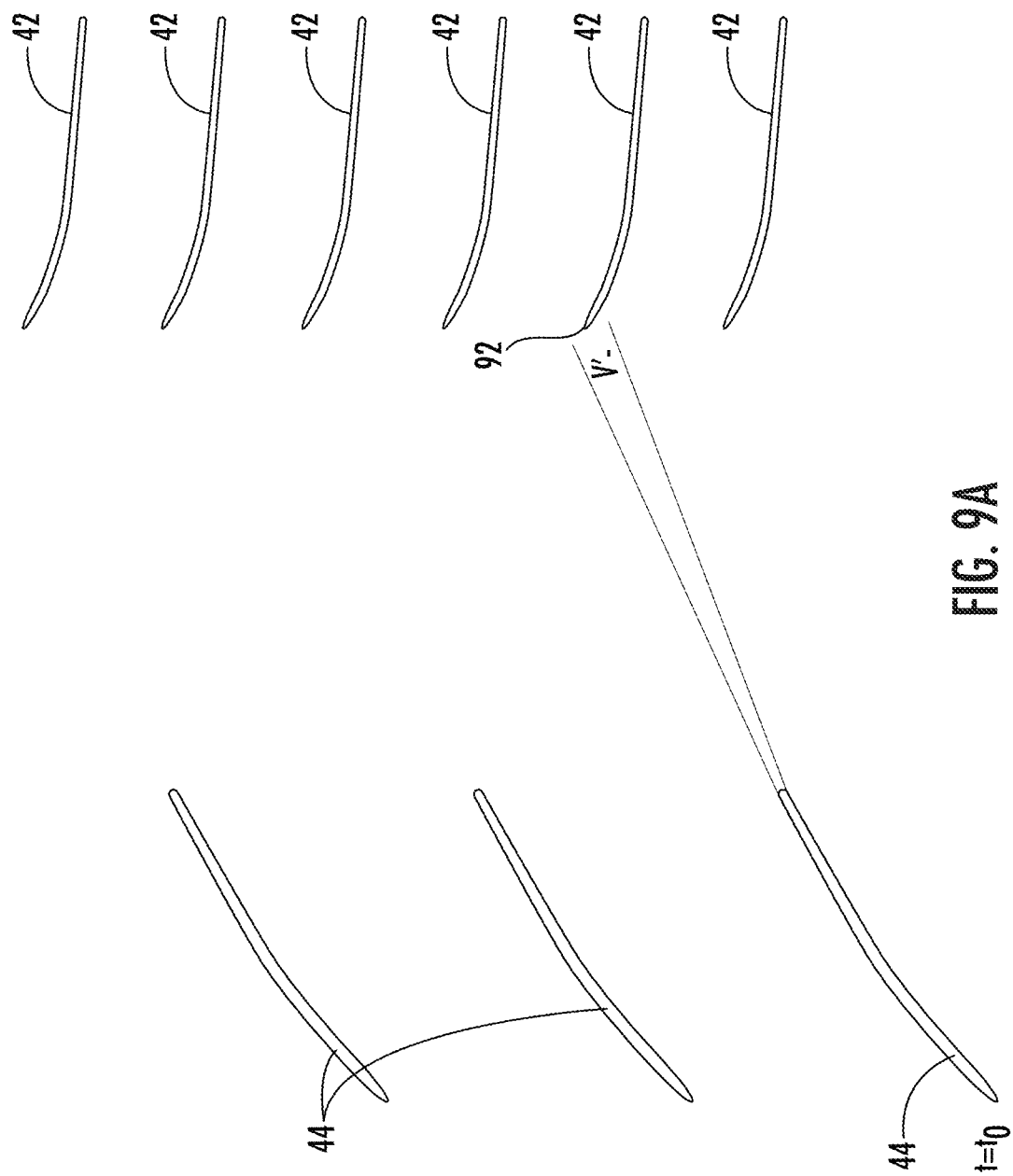

CIRCUMFERENTIALLY VARYING FAN CASING TREATMENTS FOR REDUCING FAN NOISE EFFECTS

CROSS-REFERENCE TO RELATED APPLICATION

The present application is a continuation of and claims priority to U.S. application Ser. No. 17/958,549 entitled "CIRCUMFERENTIALLY VARYING FAN CASING TREATMENTS FOR REDUCING FAN NOISE EFFECTS", filed Oct. 3, 2022, the entire disclosure of which is hereby expressly incorporated by reference herein.

FIELD

The present disclosure relates generally to gas turbine engines, and more particularly to circumferentially varying fan casing treatments for reducing fan noise effects.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere. Turbofan gas turbine engines typically include a fan assembly that channels air to the core gas turbine engine, such as an inlet to the compressor section, and to a bypass duct. Gas turbine engines, such as turbofans, generally include fan casings surrounding a fan assembly including the fan blades. The compressor section typically includes one or more compressors with corresponding compressor casings.

As is known, an axial compressor for a gas turbine engine may include a number of stages arranged along an axis of the compressor. Each stage may include a rotor disk and a number of compressor blades, also referred to herein as rotor blades, arranged about a circumference of the rotor disk. In addition, each stage may further include a number of stator blades, disposed adjacent the rotor blades, and arranged about a circumference of the compressor casing. During operation of a gas turbine engine using a multi-stage axial compressor, a set of turbine rotor blades are turned at high speeds by a turbine so that air is continuously induced into the compressor. The air is accelerated by the rotating compressor blades and swept rearwards onto the adjacent rows of stator blades. Each rotor blade/stator blade stage increases the pressure of the air.

As such, the art is continuously seeking new and improved methods of reducing noise associated with various gas turbine engine components.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIGS. 7A-7F illustrate various plots of example slot configurations for an outer casing of a rotary component and their corresponding wave patterns in accordance with aspects of the present disclosure;

FIGS. 9A-9C illustrate schematic diagrams of the wake-interaction effects between the fan blades and the outlet guide vanes of a gas turbine engine, particularly illustrating how unique parameters of features on an interior surface of an outer casing can be clocked to impact the wake interaction to reduce fan noise in accordance with aspects of the present disclosure;

Figure 1:
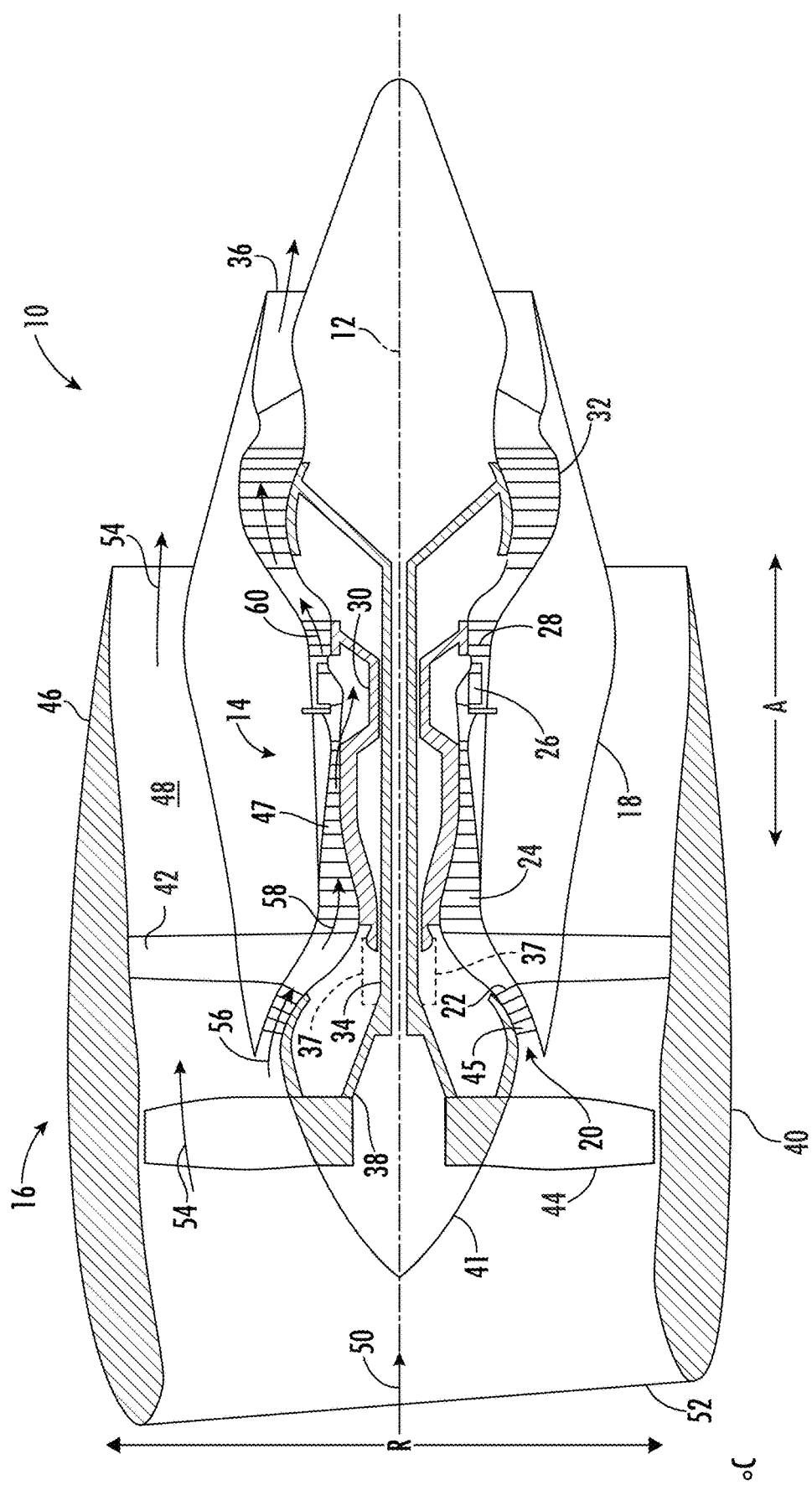
FIG. 1 illustrates a cross-sectional view of one embodiment of a gas turbine engine that may be utilized within an aircraft in accordance with aspects of the present disclosure, particularly illustrating the gas turbine engine configured as a high-bypass turbofan jet engine.

Repeat use of reference characters in the present specification and drawings is intended to represent the same or analogous features or elements of the present disclosure.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

As may be used herein, the terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "coupled", "fixed", "attached to", and the like refer to both direct coupling, fixing, or attaching, as well as indirect coupling, fixing, or attaching through one or more intermediate components or features, unless otherwise specified herein.

As may be used herein, the terms "first", "second", "third" and so on may be used interchangeably to distinguish one component from another and are not intended to signify location or importance of the individual components.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting the a second wall/surface).

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

During operation of a gas turbine engine, air passing through the various inlets may include distortion, such as pressure gradients, velocity gradients, and/or swirl or angular variations associated with the incoming flow. Furthermore, the fan assembly of the gas turbine engine may generate fan-outlet-guide-vane (OGV) interaction noise, inlet distortion/fan interaction noise, and/or fan self-noise.

Such distortion may be circumferentially varying around the inlet of the fan blades or the compressor blades. Moreover, such distortion may propagate through each subsequent stage of the compressor. Such distortion may affect the stall point of the compressor and/or the fan assembly. Stall on the compressor and/or fan blades may generally reduce the efficiency of the engine. For example, fan or compressor stalls may reduce the pressure ratio and reduce the airflow, thereby adversely affecting the efficiency and/or operability range of the engine.

In particular, as the fan starts to stall, the flow in the tip region weakens, aerodynamic blockage develops and flow diverts to adjacent tip passages and the stall blockage cell rotates. This instability eventually grows into full stall. When the inlet is subjected to high crosswinds, the flow around the inlet lip can separate, which can trigger this stalling mechanism earlier than in undistorted conditions.

As such, the present disclosure is directed to tailored fan casing treatments for reducing fan noise (such as fan self-noise, fan-outlet-guide vane interaction noise, and/or fan inlet distortion-related noise). In particular, the fan casing treatments of the present disclosure are configured to reduce the noise source, with acoustic liners optionally employed in the fan duct to attenuate the noise before the noise propagates outside the engine. More specifically, it is generally known that fan operation and stall limits can be extended through the use of casing treatments. However, the present disclosure is directed to uniquely designed circumferentially varying patterns of fan casing treatments through which fan noise can be reduced as described herein. As such, the novel concept of the present disclosure can be extended to address fan inlet distortion related noise as will also be described.

In an embodiment, for example, the fan casing treatments of the present disclosure are configured to account for the azimuthal sectors that suffer greater levels of distortion to mitigate the operability and aeromechanics risks before stall dynamics begin to develop. For example, in an embodiment, the fan casing treatments may include feature(s) having design parameters (such as a slot design) arranged in a wave pattern, wherein the circumferential wave number is equal to a multiple of outlet guide vanes. In such embodiments, the design parameters may be perturbed about a mean design parameter for stall performance (e.g., to include zero mean casing treatment for specific cases where stall performance does not require mean casing treatments) so as to provide a circumferential variation in wake strengths associated with the fan blades. The design parameters may include, for example, blade overlap, passage width, slot depth, length and relative blade position, and the like, and combinations thereof. Moreover, the wave pattern of the design parameters may be clocked circumferentially relative to the OGVs to ensure the low noise wakes impinge on the leading edges of the outlet guide vanes and the high noise wakes (where "low noise wakes" and "high noise wakes" generally denote wakes with lower/higher energy content that would lead to quieter/louder fan-outlet-guide vane interaction noise, respectively, relative to the mean state) pass between the outlet guide vanes for at least one of a set of noise-sensitive operating condition(s).

In another embodiment, the feature(s) may include a circumferential variation in at least one of the design parameters described herein, which can be designed to equilibrate N/rev blade unsteady loading in response to the inflow distortion for at least one of a set of noise-sensitive operating condition(s). In such embodiments, the design parameters can take into account an aggressive short inlet windward side crosswind distortion and/or a high takeoff angle-of-attack distortion.

In still further embodiments, the feature(s) may include acoustic treatment concepts integrated at outer diameter surfaces of the feature(s) for fan self-noise reduction. The acoustic treatments may include, for example, a bulk absorber feature, a perforated material resistance layer, a wire mesh resistance layer, a single-degree-of-freedom acoustic liner, a double-degree-of-freedom acoustic liner, a multiple-degree-of-freedom acoustic liner, or combinations thereof.

Referring now to the drawings, FIG. 1 illustrates a cross-sectional view of an embodiment of a gas turbine engine 10 that may be utilized within an aircraft in accordance with aspects of the present disclosure. More particularly, for the embodiment of FIG. 1, the gas turbine engine 10 is a high-bypass turbofan jet engine, with the gas turbine engine 10 being shown having a longitudinal or axial centerline axis 12 extending therethrough along an axial direction A for reference purposes. The gas turbine engine 10 further defines a radial direction R extending perpendicular from the centerline 12. Further, a circumferential direction C (shown in/out of the page in FIG. 1) extends locally perpendicular (i.e., circumferentially about the centerline 12) to both the centerline 12 and the radial direction R. Although an exemplary turbofan embodiment is shown, it is anticipated that the present disclosure can be equally applicable to turbomachinery in general, such as a turboshaft, turbojet, or a turboprop configuration, including marine and industrial turbine engines and auxiliary power units.

In general, the gas turbine engine 10 includes a core gas turbine engine (indicated generally by reference character 14) and a fan section 16 positioned upstream thereof. The core engine 14 generally includes a substantially tubular outer casing 18 that defines an annular inlet 20. In addition, the outer casing 18 may further enclose and support a low pressure (LP) compressor 22 for increasing the pressure of the air that enters the core engine 14 to a first pressure level. A multi-stage, axial-flow high pressure (HP) compressor 24 may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. The high energy combustion products 60 are directed from the combustor 26 along the hot gas path of the gas turbine engine 10 to a high pressure (HP) turbine 28 for driving the HP compressor 24 via a high pressure (HP) shaft or spool 30, and then to a low pressure (LP) turbine 32 for driving the LP compressor 22 and fan section 16 via a low pressure (LP) drive shaft or spool 34 that is generally coaxial with HP shaft 30. After driving each of turbines 28 and 32, the combustion products 60 may be expelled from the core engine 14 via an exhaust nozzle 36 to provide propulsive jet thrust.

Figure 2:
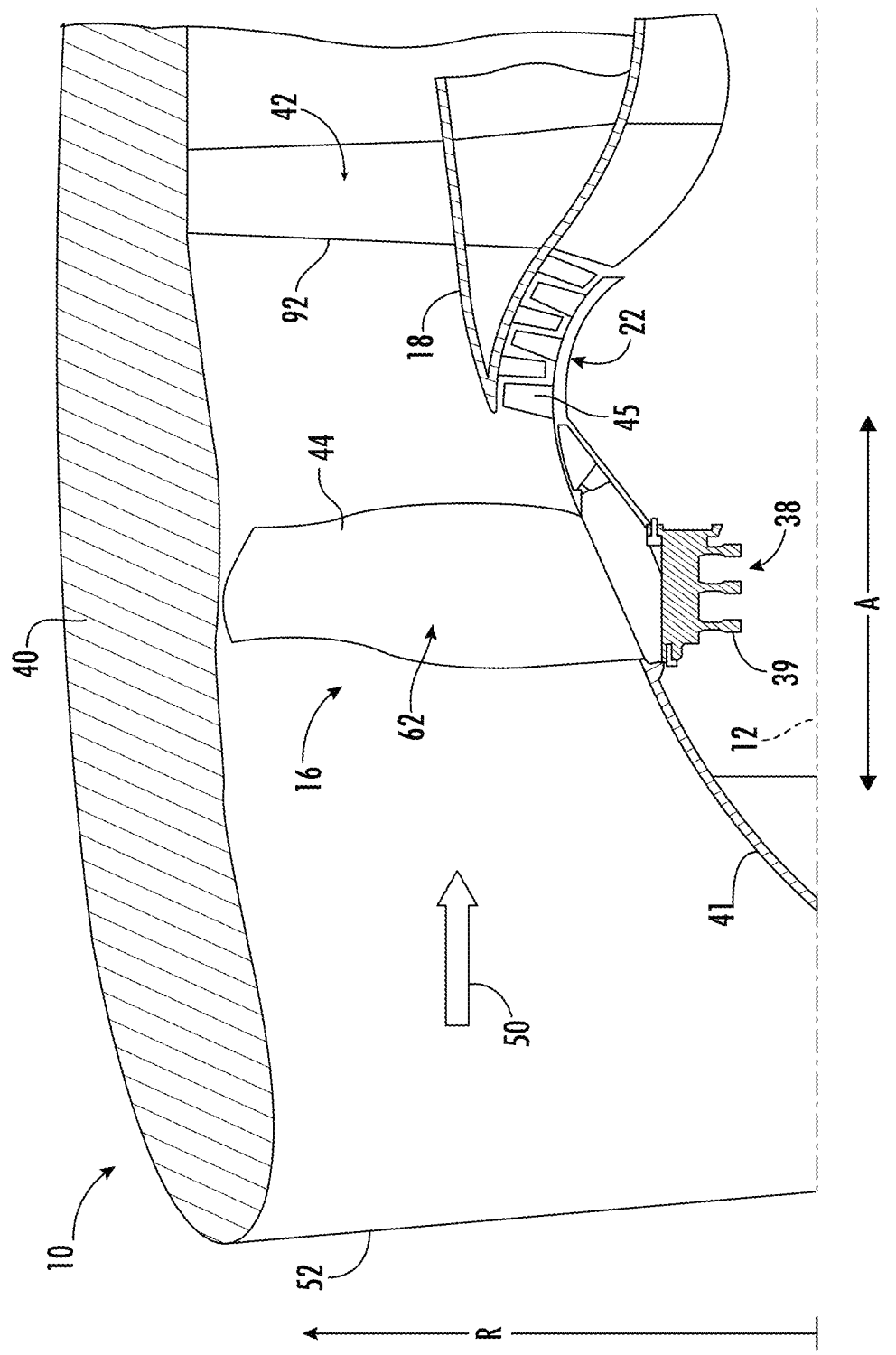
FIG. 2 illustrates a partial, cross-sectional view of the fan section of FIG. 1 in accordance with aspects of the present disclosure, particularly illustrating a fan blade of the fan section.

Additionally, as shown in FIGS. 1 and 2, the fan section 16 of the gas turbine engine 10 generally includes a rotatable, axial-flow fan rotor 38 configured to be surrounded by an annular fan casing 40. In particular embodiments, the LP shaft 34 may be connected directly to the fan rotor 38 or a rotor disk 39, such as in a direct-drive configuration. In alternative configurations, the LP shaft 34 may be connected to the fan rotor 38 via a speed reduction device 37 such as a reduction gear gearbox in an indirect-drive or geared-drive configuration. Such speed reduction devices may be included between any suitable shafts/spools within the gas turbine engine 10 as desired or required. Additionally, the fan rotor 38 and/or rotor disk 39 may be enclosed or formed as part of a fan hub 41.

It should be appreciated by those of ordinary skill in the art that the fan casing 40 may be configured to be at least partially supported relative to the core engine 14 by a plurality of substantially radially-extending, circumferentially-spaced outlet guide vanes 42. As such, the fan casing 40 may enclose the fan rotor 38 and its corresponding fan rotor blades (fan blades 44). Moreover, a downstream section 46 of the fan casing 40 may extend over an outer portion of the core engine 14 so as to define a secondary, or by-pass, airflow conduit 48 that provides additional propulsive jet thrust.

During operation of the gas turbine engine 10, it should be appreciated that an initial airflow (indicated by arrow 50) may enter the gas turbine engine 10 through an associated inlet 52 of the fan casing 40. The airflow 50 then passes through the fan blades 44 and splits into a first compressed airflow (indicated by arrow 54) that moves through the by-pass conduit 48 and a second compressed airflow (indicated by arrow 56) which enters the LP compressor 22. The LP compressor 22 may include a plurality of rotor blades (LP rotor blades 45) enclosed by the outer casing 18. The pressure of the second compressed airflow 56 is then increased and enters the HP compressor 24 (as indicated by arrow 58). Additionally, the HP compressor 24 may include a plurality of rotor blades (HP rotor blades 47) enclosed by the outer casing 18. After mixing with fuel and being combusted within the combustor 26, the combustion products 60 exit the combustor 26 and flow through the HP turbine 28. Thereafter, the combustion products 60 flow through the LP turbine 32 and exit the exhaust nozzle 36 to provide thrust for the gas turbine engine 10.

Figure 3A:
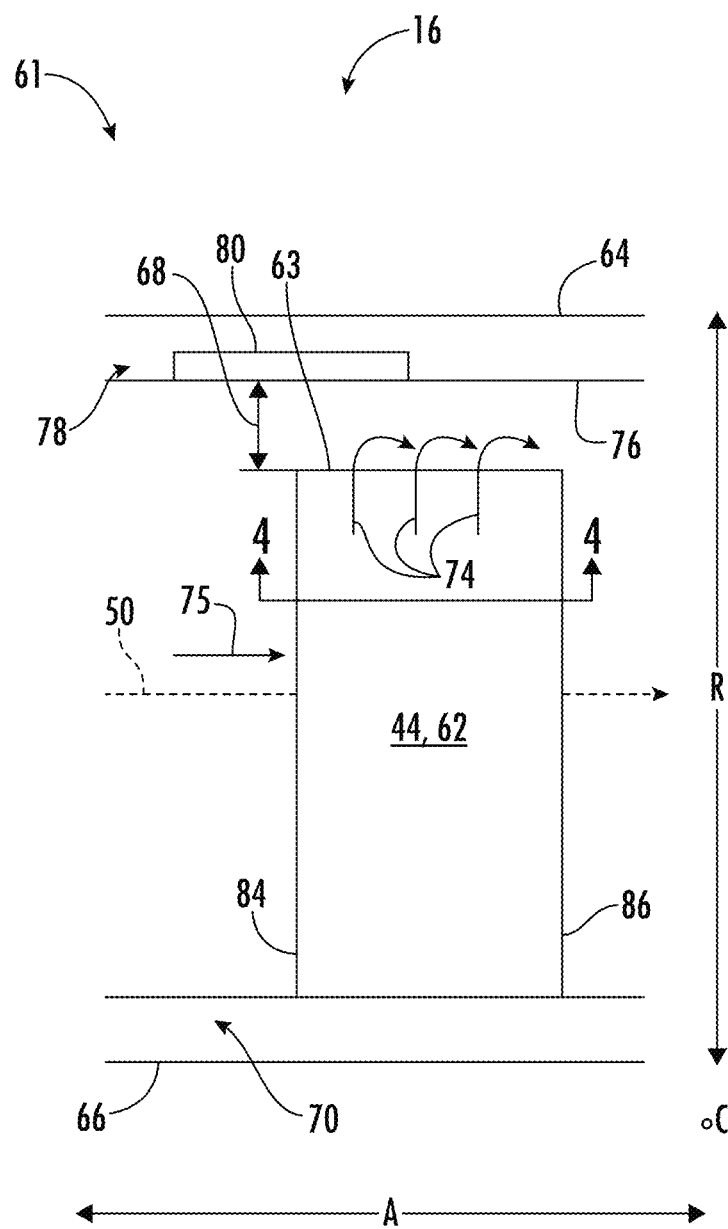
FIG. 3A illustrates a schematic view of a rotary component of the gas turbine engine in accordance with aspects of the present disclosure, particularly illustrating the rotary component configured as a fan section and having at least one slot per outlet guide vane in the outer casing.
Figure 3B:
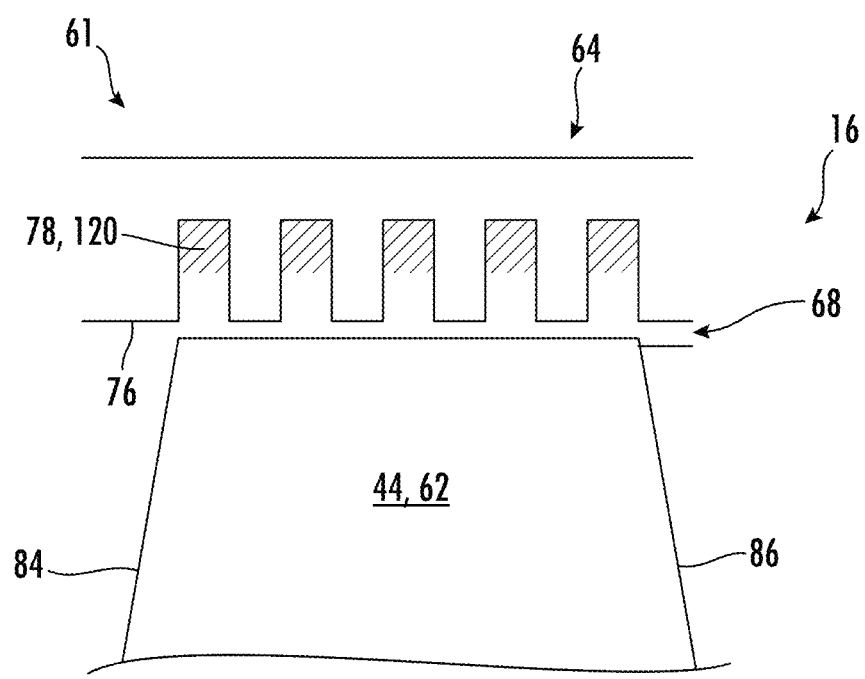
FIG. 3B illustrates a schematic view of a rotary component of the gas turbine engine in accordance with aspects of the present disclosure, particularly illustrating the rotary component configured as a fan section and having a circumferential groove in the outer casing.
Figure 4:
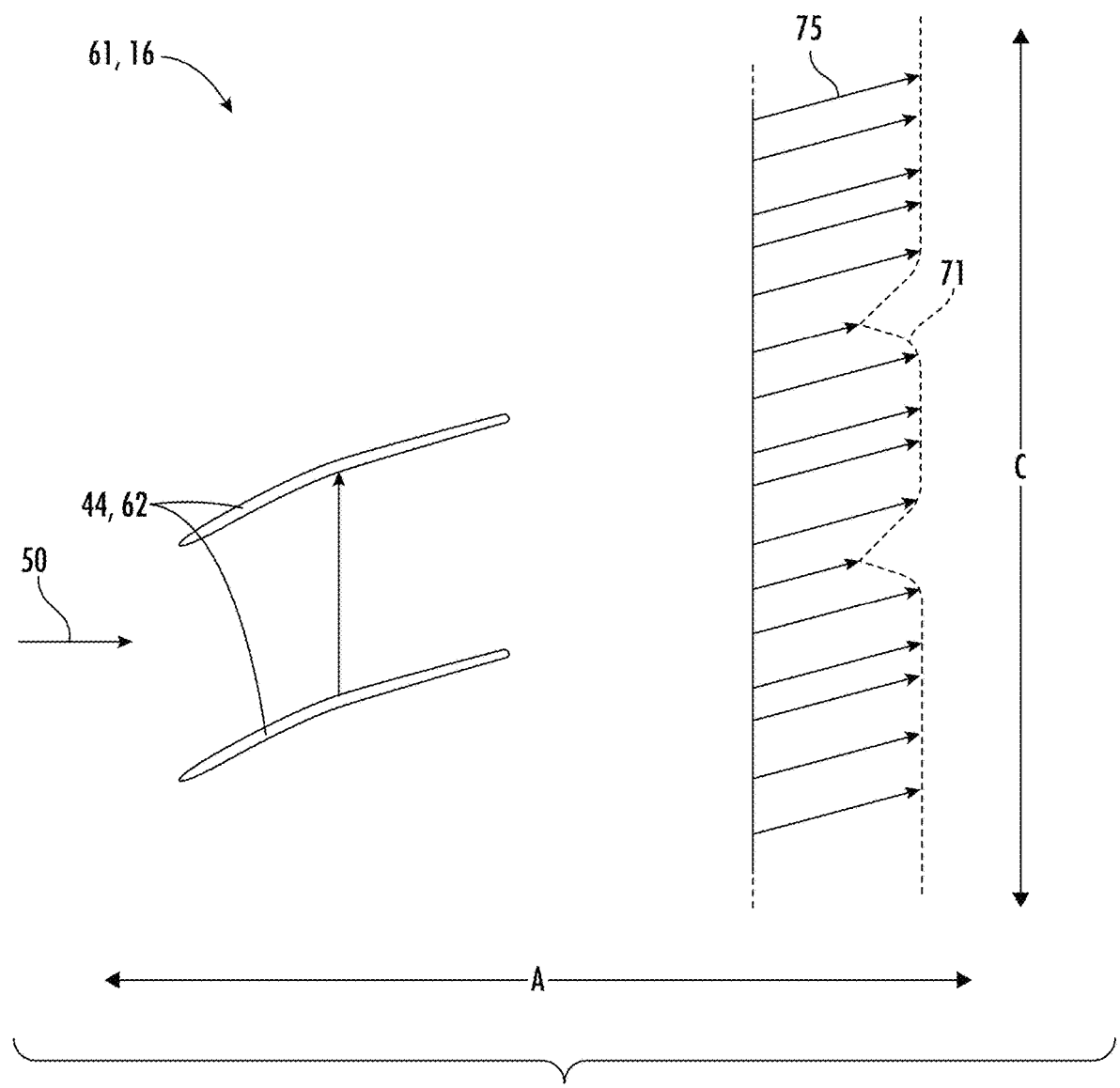
FIG. 4 illustrates a cross-section of the rotary component of FIG. 3A along section line 4-4 in accordance with aspects of the present disclosure.

Referring now to FIGS. 3A, 3B, and 4, various views of an embodiment of a rotary component 61 of the gas turbine engine 10 of FIG. 1 are illustrated. Specifically, as shown, the rotary component 61 may be configured as a portion of the fan section 16, but it should be appreciated that the rotary component 61 may be configured as the LP compressor 22, the HP compressor 24, the HP turbine 28, the LP turbine 32, and/or any other rotary component 61 of the gas turbine engine 10. As indicated, FIG. 4 is taken along section line 4-4 of FIG. 3A. As shown, the rotary component 61 includes a one or more sets of circumferentially spaced rotor blades 62, such as fan blades 44, which extend radially outward towards an outer casing 64 from a hub 66. As such, the rotor blades 62 may be coupled to a rotating shaft (such as fan rotor 38 as shown in FIG. 1). Further, the outer casing 64 may be arranged exterior to the rotor blades 62 in the radial direction R. It should be appreciated that the outer casing 64 may be a part of the fan casing 40 (FIG. 1) or a standalone component coupled thereto. Each of the rotor blades 62 may be circumscribed by the outer casing 64, such that a tip clearance gap 68 is defined between the outer casing 64 and a rotor blade tip 63 of each rotor blade 62.

During operation, the aerodynamic loading and efficiency of the rotary component 61 is generally affected by the tip leakage flow, as indicated by directional arrows 74 (FIG. 3A), proximate the rotor blade tips 63, as well as aerodynamic loading and drag effects as the airflow passes over the rotor blades 62 through the passages between adjacent rotor blades 62. This results in wakes from the rotor blades 62 that evolve downstream and appear upon arriving at the OGVs 42 (FIG. 2), as illustrated in FIG. 4, as a plurality of airflow variations 71, such as fan or rotor wakes. In particular, as shown in FIG. 4, these fan or rotor wakes are illustrated as an undistorted wakes, wherein the inflow to the fan section 16 (FIG. 1) is substantially uniform about the circumferential direction.

Additionally, the initial airflow 50 traveling through the inlet 52 through the annular inlet 20 may include flow non-uniformities 75 both radially and circumferentially (as shown in FIGS. 3A-5). Such flow non-uniformities 75 may be present in the initial airflow 50 passing through the inlet 52, and/or the fan section 16 may form such circumferential flow non-uniformities 75. These flow non-uniformities 75 upon interaction with the rotor blades 62 result in circumferentially distorted wakes, which result in perturbed wake shapes to what is illustrated as the airflow variations 71 of FIG. 4. Such distorted wakes are deeper and/or wider when associated with overloaded fan blade responses to the distorted inflow, and vice versa for underloaded responses. To reduce fan-OGV interaction noise, one must address both the wakes associated with a mean undistorted fan inflow response as well as the potentially distorted wakes resulting from a distorted inflow fan response, which is the subject of this disclosure as described below.

Figure 5:
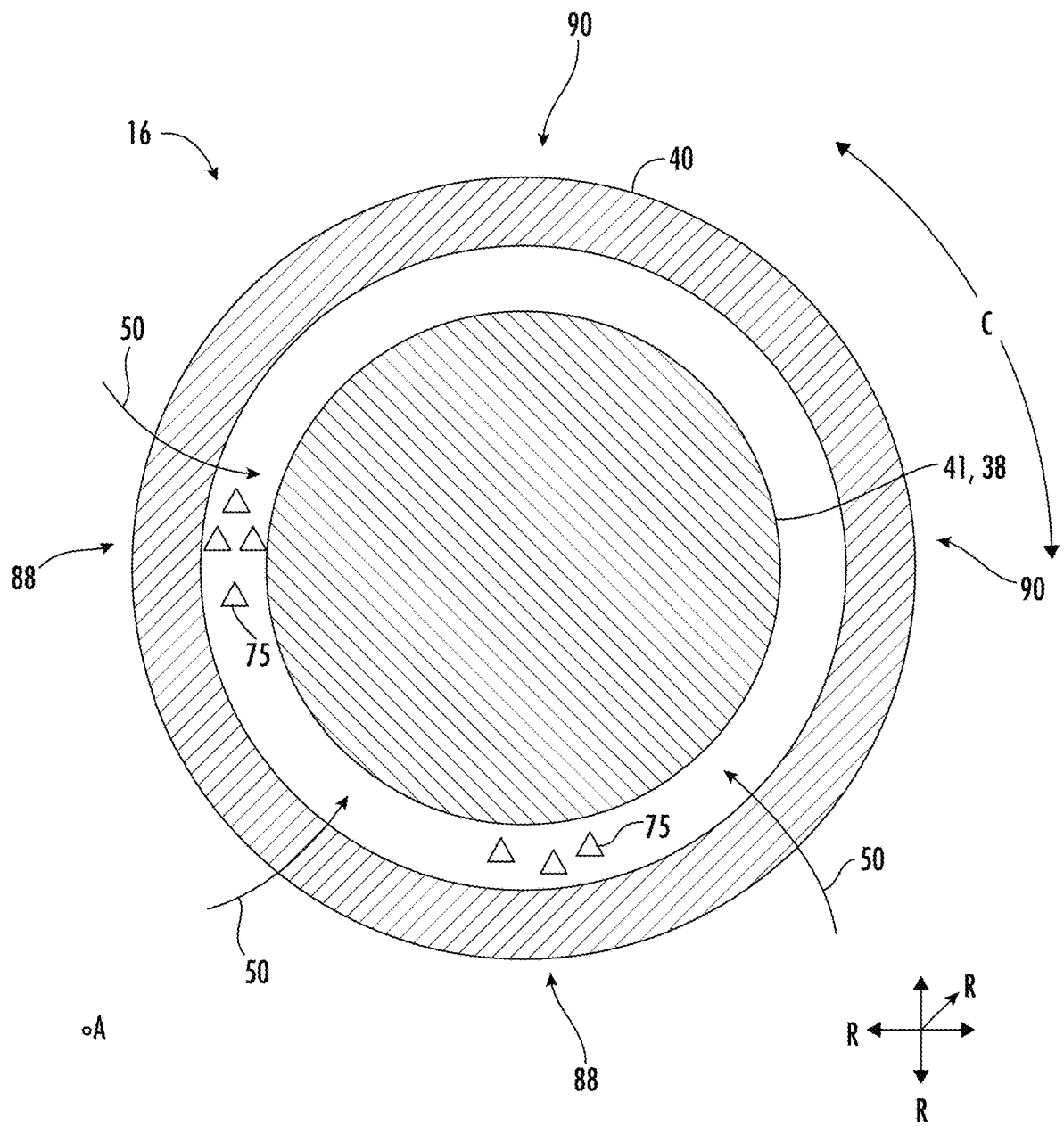
FIG. 5 illustrates a cross-section of a core engine taken the along radial and circumferential directions in accordance with aspects of the present disclosure, particularly illustrating a cross-section taken at an annular inlet of the core engine.

Referring now to FIG. 5, a cross-section of the fan section 16 is illustrated along the radial direction R and circumferential direction C. Further, as illustrated, the initial airflow 50 may be directed across the fan blades 44 (not shown) and into the core engine 14 (FIG. 1). Further, as shown, the initial airflow 50 may contain flow non-uniformities (illustrated as triangles 75 in FIG. 5) such as but not limited to pressure, temperature, velocity, and/or swirl or angular variations. As shown, the flow non-uniformities 75 may vary along the circumferential direction C of the fan casing 40. As such, the initial airflow 50 may define one or more high distortion locations 88 and one or more low distortion locations 90. Further, the high distortion locations 88, which are generally caused by crosswind and angle of attack effects, may affect the stall margins and/or efficiency of the fan section 16.

Further, such high distortion level locations 88 may be introduced by one or more stages 70 (FIGS. 3A-3B) of the rotary component(s) 61 (FIGS. 3A-3B) and affect stages 70 of the rotary component(s) 61 downstream thereof. For example, high distortion level locations 88 may be introduced by the fan section 16 and affect the LP compressor 22 (FIG. 1) and HP compressor 24 (FIG. 1) downstream of the fan section 16. Further, high distortion level locations 88 flowing through annular inlet 20 (FIG. 1) may affect the LP compressor 22 and HP compressor 24. Further, high distortion locations 88 may be introduced by the LP compressor 22 (such as by the upstream stages 70 of the LP compressor 22) and affect downstream stages 70 of the LP compressor 22 or the HP compressor 24. In addition, high distortion locations 88 may be introduced by the HP compressor 24 (such as by the upstream stages 70 of the HP compressor 24) and affect downstream stages 70 of the HP compressor 24.

Referring specifically to FIGS. 3A and 3B, novel features 78 for the outer casing 64 that address the circumferential flow non-uniformities 75 described herein to reduce fan noise are illustrated. In particular, as shown in each of FIGS. 3A and 3B, the outer casing 64 may define an interior surface 76. Further, as shown, the tip clearance gap 68 may be defined between the rotor blades 62 and the interior surface 76. Further, the interior surface 76 may include a plurality of the features 78. For instance, as shown in FIG. 3A, the feature(s) 78 may include one or more slots 80. In particular embodiments, as shown, the slots 80 may extend generally along the axial direction A. However, in further embodiments, the slot(s) 80 may extend along any suitable direction. Such feature(s) 78 may be formed in the outer casing 64 after manufacturing the outer casing 64 (e.g., the features 78 may be machined in the interior surface 76 of the outer casing 64). However, in other embodiments, the feature(s) 78 may be formed integrally with the outer casing 64 (e.g., the features 78 may be formed in the outer casing 64 during an additive manufacturing process or casting process). Furthermore, as shown in FIG. 3B, the feature(s) 78 may include one or more circumferential grooves 120.

Thus, as shown in FIGS. 3A and 3B, one or more of the features 78 may be positioned radially outward from one or more of the rotor blades 62 and into the volume of the enshrouding nacelle or casing structure delimited by interior surface 76 and outer casing 64. Further, the feature(s) 78 may be positioned axially between a leading edge 84 and a trailing edge 86 of the rotor blade(s) 62. For instance, each of the features 78 may be positioned between the leading edges 84 and trailing edges 86 of the rotor blades 62 of a stage 70 of the rotary component 61. As such, the feature(s) 78 may be positioned within one or more of the blade passages positioned between the rotor blade tips 63 of a stage 70 and the outer casing 64. In further embodiments, one or more of the features 78 of may be positioned at least partially radially outward from one or more of the rotor blades 62 on the interior surface 76 of the outer casing 64. For instance, the feature(s) 78 may be positioned at least partially axially forward of the leading edge 84 or at least partially axially rearward of trailing edge 86 of the rotor blade(s) 62, such as the rotor blades 62 of a stage 70. As such, one or more of the features 78 may be positioned partially within one or more of the blade passages.

Figure 6:
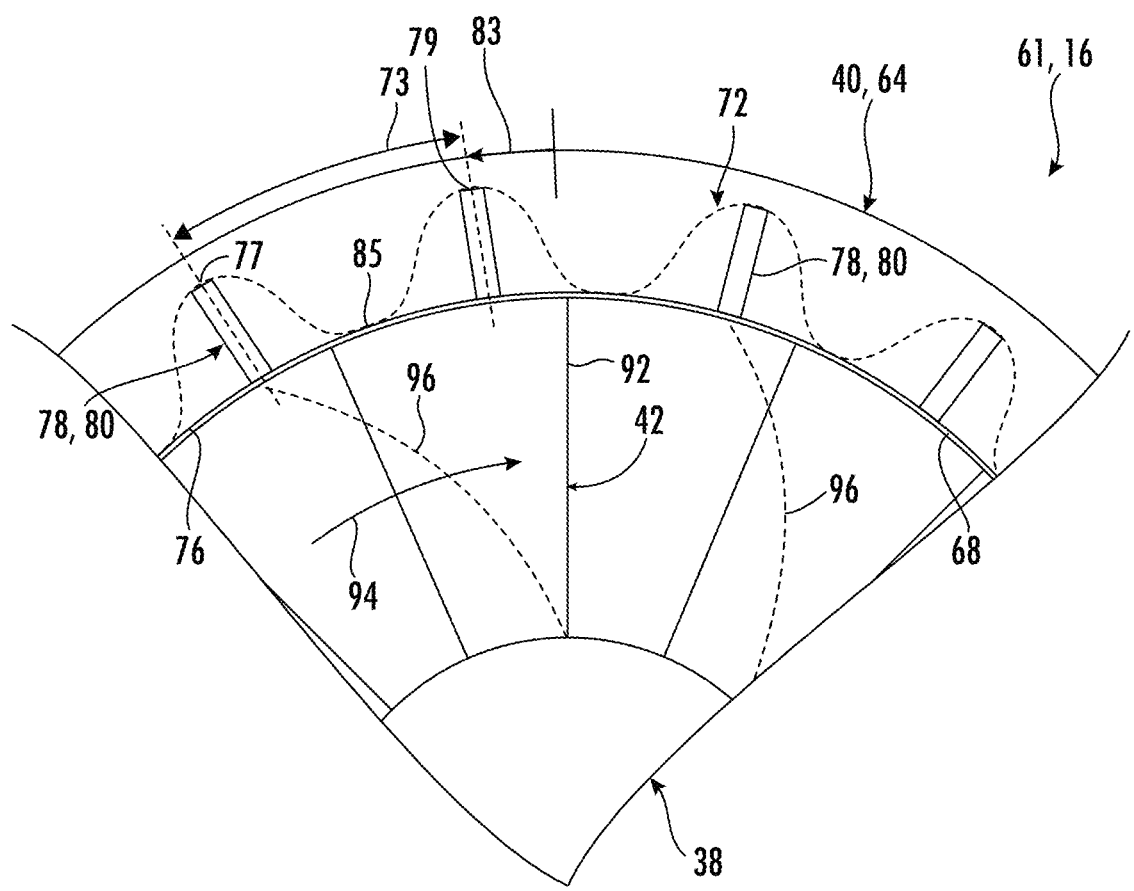
FIG. 6 illustrates a partial, front view of an embodiment of a rotary component of a gas turbine engine including features on an interior surface of an outer casing configured to reduce fan noise.
Figure 8:
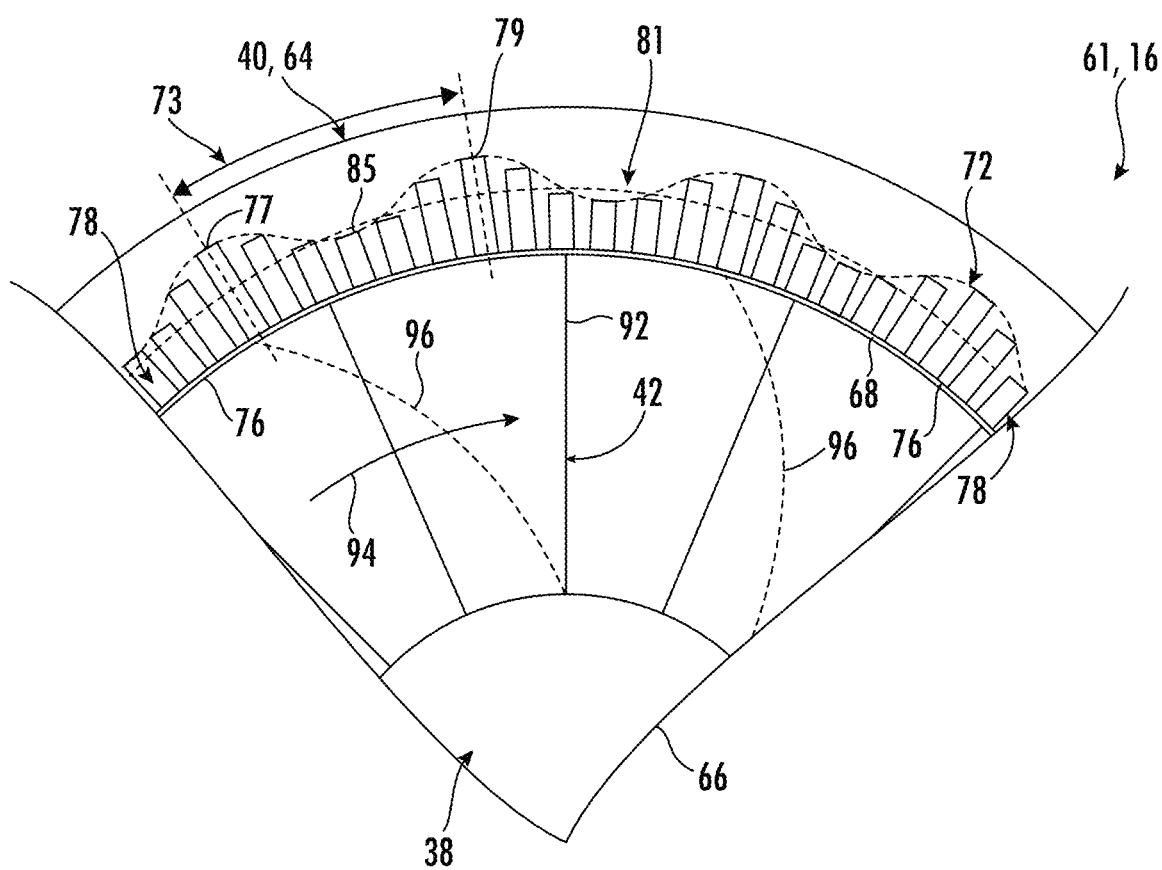
FIG. 8 illustrates a partial, front view of an embodiment of a rotary component of a gas turbine engine including features on an interior surface of an outer casing configured to reduce fan noise.

Referring to now generally to FIGS. 6-16, multiple embodiments of rotary components 61 including features 78 on the interior surface 76 of the outer casing 64 are illustrated in accordance with aspects of the present disclosure. Particularly, FIG. 6 illustrates a partial, front view of an embodiment of the rotary component 61 with the features 78 on the interior surface 76 of the outer casing 64 in accordance with aspects of the present disclosure; FIGS. 7A-7F illustrate various plots of example slot configurations for the outer casing 64 of the rotary component 61 and their corresponding wave patterns in accordance with aspects of the present disclosure; and FIG. 8 illustrates a partial, front view of another embodiment of the rotary component 61 with the features 78 on the interior surface 76 of the outer casing 64 in accordance with aspects of the present disclosure.

Figure 16:
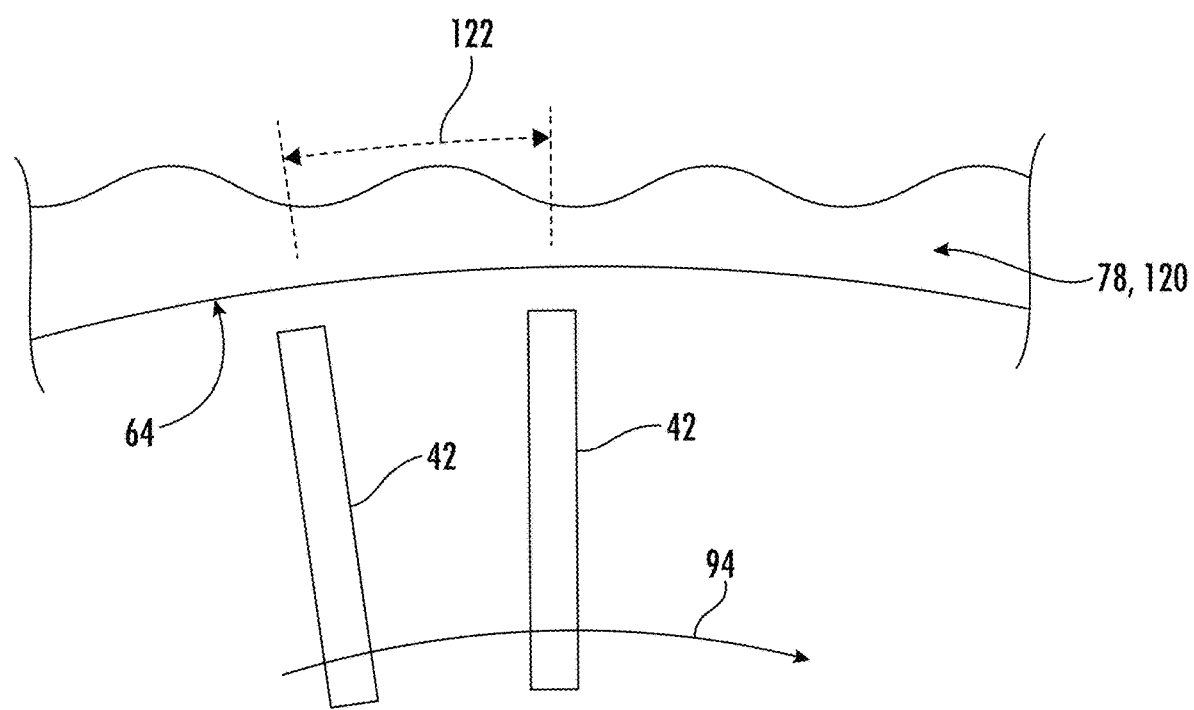
FIG. 16 illustrates a partial, front view of another embodiment of a rotary component of a gas turbine engine including a circumferential groove formed into an interior surface of an outer casing configured to reduce fan noise.

More specifically, as shown in FIGS. 6 and 8 and mentioned, the fan section 16 includes the outer casing 64, such as fan casing 40, arranged exterior to the plurality of fan blades 44 in the radial direction. The fan casing 40 defines a tip clearance gap 68 (FIGS. 11 and 12) between rotor blade tips 63 of the fan blades 44 and the fan casing 40. Moreover, as shown in FIGS. 6 and 8 and mentioned, the fan casing 40 includes a plurality of features 78 formed into an interior surface 76 thereof. For example, in an embodiment, as shown in FIGS. 6 and 8, one or more of the features 78 may be a slot 80, such as an axial slot. In another embodiment, as shown in FIGS. 3B and 16, one or more of the features 78 may be a circumferential groove 120.

Furthermore, as shown in the embodiment of FIGS. 6 and 8, each of the plurality of features 78 includes one or more design parameters. For example, as shown in FIG. 8, the design parameter(s) of the features 78 may be perturbed about a mean design parameter (e.g., such as a mean depth 81) for stall performance so as to provide a circumferential variation in wake strengths associated with the plurality of fan blades 44, thereby reducing fan-outlet-guide-vane interaction noise of the gas turbine engine 10. As used herein, the term "design parameter" generally refers to a predetermined characteristic of one or more of the features 78 relating to design of the feature(s) 78 that can be ascertained or set at the design stage of the outer casing 40. More specifically, for example, in the context of FIGS. 6 and 8, the term "design parameter" refers to one of, or a combination of two or more of: blade overlap, a radial height, an axial dimension, a circumferential dimension, an orientation, relative blade position, slot type, and separation distance between two adjacent features of the plurality of features, and combinations thereof. Moreover, as used herein, the term "separation distance between adjacent features" refers to a distance from one feature to the next closest feature (with no features positioned therebetween).

Figure 9B:
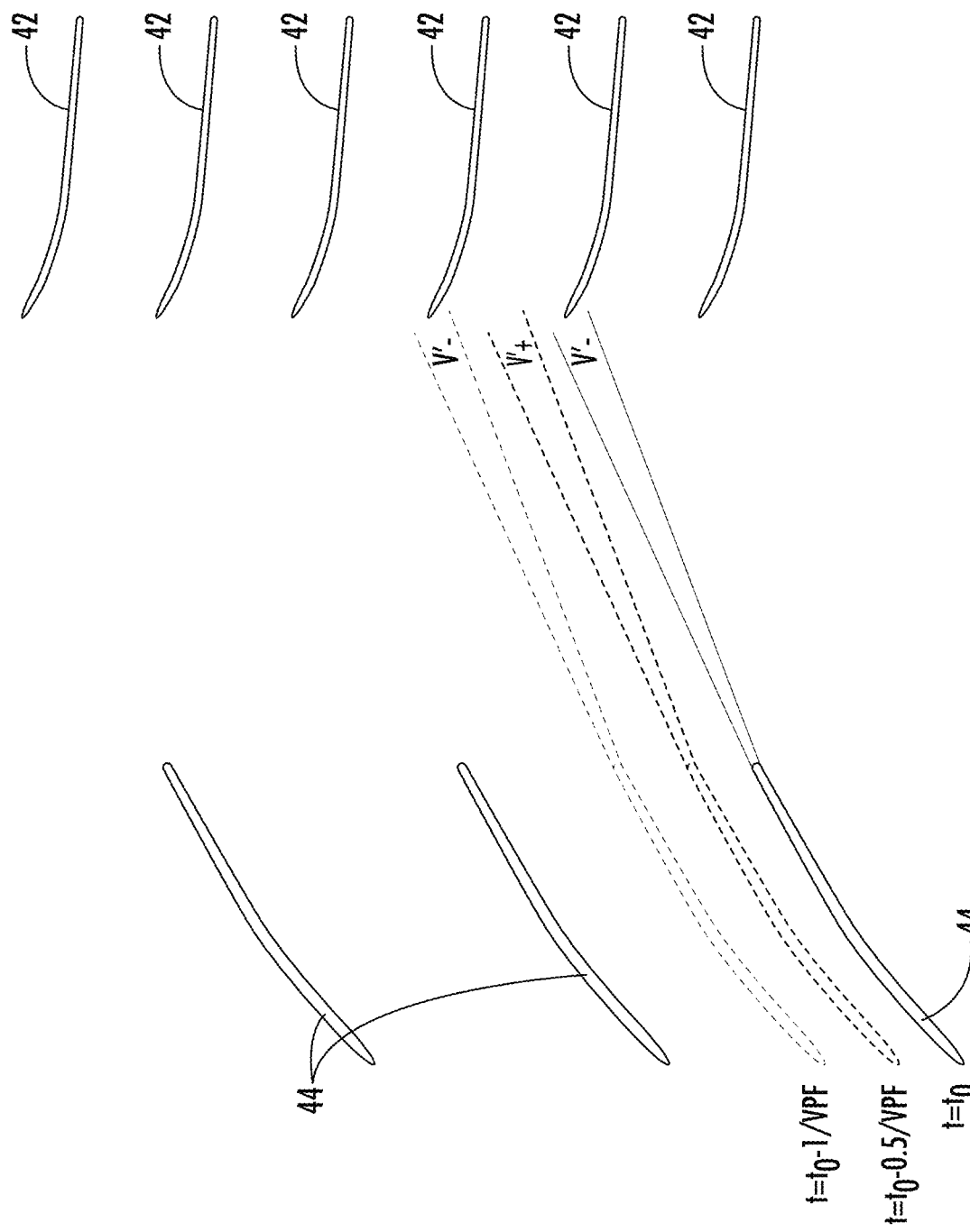

In further embodiments, as shown in FIGS. 6 and 8, the design parameter(s) of the plurality of features 78 may define a wave pattern 72 with a plurality of wave cycles 73 or periodic repetitions. In particular, as shown in FIGS. 6 and 8, a single wave cycle 73 of the wave pattern 72 extends from a first crest 77 to a second crest 79 with a trough 85 in between. Thus, in an embodiment, each of the plurality of wave cycles 73 may be circumferentially equal to a multiple of downstream guide vanes, such as outlet guide vanes 42 (FIG. 2) (such as 1×, 2×, 3×, etc. a multiple of downstream guide vanes). Moreover, as shown in FIGS. 6 and 8, in an embodiment, the fan blades 44 rotate in a clockwise direction 94 and generate wakes 96. As such, in an embodiment, the wave pattern 72 of the design parameter(s) of the plurality of features 78 may be clocked with the outlet guide vanes 42 to ensure low noise wakes (such as wakes 96) impinge on leading edges 92 of the outlet guide vanes 42 and high noise wakes pass between the outlet guide vanes 42 (as depicted in FIG. 9B and described further below) for one or more noise-sensitive operating conditions, such as acoustic certification conditions that may include sidelines, cutback, and/or approach.

Furthermore, in such embodiments, the number of wave cycles 73 or periodic repetitions of the wave pattern 72 of the features 78 may be selected as a function of a number of the downstream outlet guide vanes 42 and one or more design considerations such that blade tip loading is varied and wake shed from the fan blades 44 is clocked to the downstream outlet guide vanes 42. In particular embodiments, for example, the number of wave cycles 73 of the wave pattern 72 may be selected using the relationship below:

$$N_{CT} = k \cdot N_V$$

Where $N_V$ is the number of outlet guide vanes 42 downstream of the fan blades 44, k is any integer 1, 2, 3 etc. depending on other design considerations or preferences, and $N_{CT}$ is the number of waves or cycles of features, which can be the number of physical features or the periodicity of the wave or repeating pattern (relating to the circumferential non-uniformity in their design parameters).

In an embodiment, for example, as shown in FIG. 6, the features 78 may include a single slot 80 per downstream guide vane. Thus, as shown at 83, the full array of slots 80 may be clocked relative to the array of downstream outlet guide vanes 42 in that the full array of slots 80 is shifted circumferentially to favorably align the wakes 96 to account for how the wakes 96 evolve, swirling circumferentially as the wakes evolve downstream (FIG. 6). As used herein, the term "clocking" generally describes the process of circumferentially arranging the features 78 with respect to the downstream guide vanes in a manner such that low noise wakes (such as the tip vicinity of the wakes 96) impinge on the leading edges 92 of the outlet guide vanes 42 and high noise wakes pass between the outlet guide vanes 42. Such clocking may be determined using design methods and/or computational models well known to one skilled in the art of turbomachinery aerodynamics. For example, for a fan exit flow swirl angle $\alpha_2$ and fan trailing edge circumferential location $\theta$, the circumferential location where a fan tip wake impinges on an OGV tip leading edge is given approximately by the relationship $\theta + L \tan \alpha_2/R_{tip}$ In such embodiments, this relationship can be used to determine the circumferential location or clocking offset relative to the OGVs of the non-uniform casing treatment parameters such that the low noise wakes impinge on the OGV leading edges and the high noise wakes pass between the OGVs.

Furthermore, as shown in FIGS. 7A-7F, various plots of example slot configurations for the slots 80 (FIGS. 6 and 8) in accordance with aspects of the present disclosure are provided. In particular, FIG. 7A illustrates a single slot square wave pattern according to the present disclosure, wherein the width, w, of the slots can be designed relative to the spacing between vanes, $S=2\pi R_{TIP}/N_V$, to affect what can be thought of as a duty cycle w/S. FIG. 7B illustrates a double slot wave pattern according to the present disclosure. The concept naturally extends to multiple slots per wave such as FIGS. 7C and 7D illustrate for two examples of generally symmetric wave patterns according to the present disclosure. FIGS. 7E and 7F illustrate two examples of generally asymmetric wave patterns according to the present disclosure. Here, symmetrical generally refers to symmetry of the wave patterns about the mid-wavelength location as pictured in FIGS. 7C-7D. It should be understood that FIGS. 7A-7F are provided for illustrative purposes only and are not meant to be limiting.

Figure 9C:
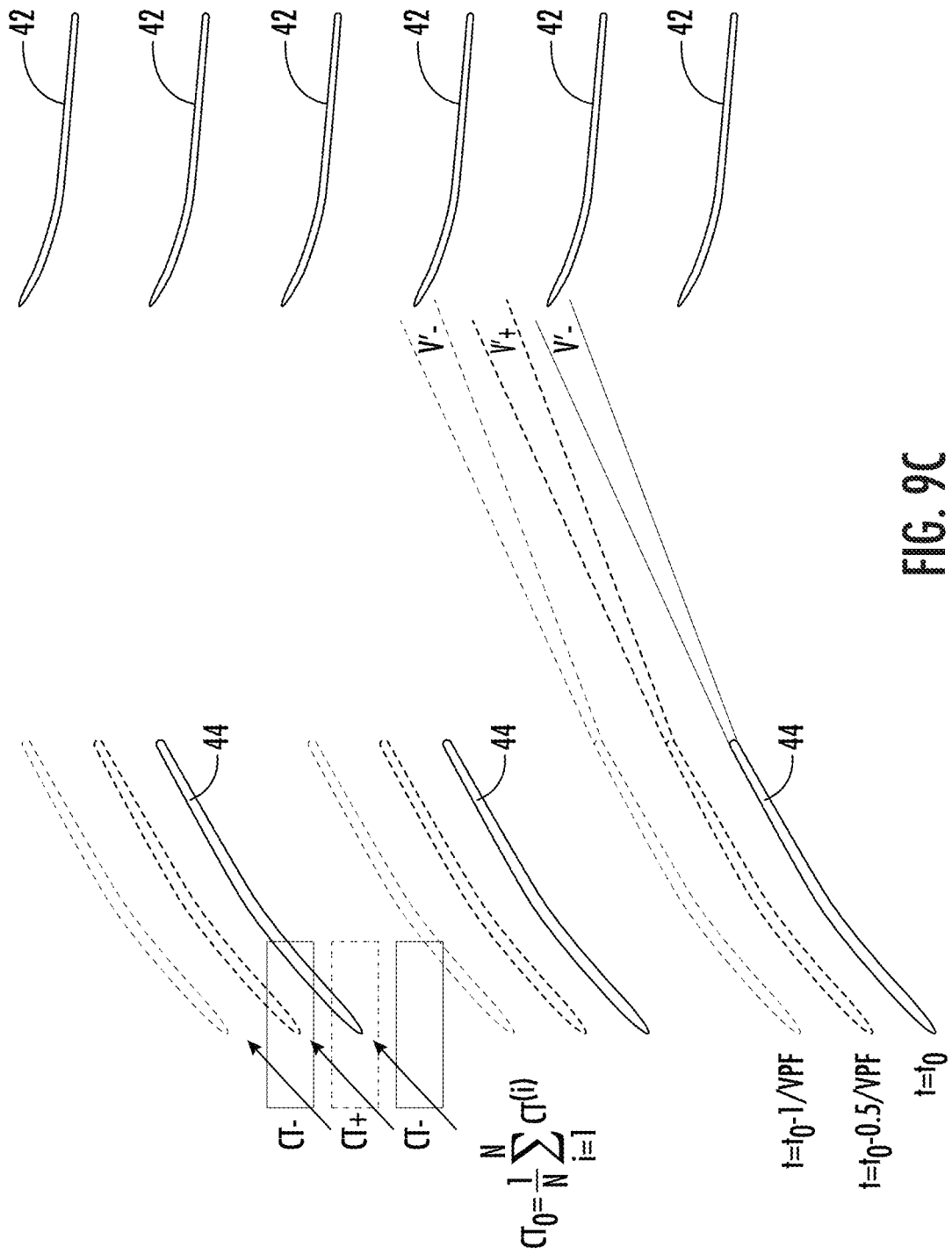

The wake interaction effects between the fan blades 44 and the outlet guide vanes 42 as well as clocking of the wave pattern 72 (FIGS. 6 and 8) of the design parameter(s) of the plurality of features 78 (FIGS. 6 and 8) with the outlet guide vanes 42 can be better understood with respect to FIGS. 9A-9C. In particular, as shown in FIG. 9A, at time (t)=$t_0$, the instant when the tip portion of the fan wakes impinge on the leading edge 92 of the outlet guide vane 42 is identified (as shown at v'−). As shown in FIG. 9B, the wake (gust) strengths are varied circumferentially about the mean solution. Thus, quiet portions (as shown by v'−) can be aligned (e.g., $t=t_0-1/$(vane passing frequency, VPF) to reduce the outlet guide vane interaction noise and loud portions (denoted as v'+) can be aligned (e.g., $t=t_0-0.5/$VPF) between the outlet guide vane 42 to compensate for an average mean flow behavior as desired. Accordingly, as shown in FIG. 9C, the design parameter(s) can be selected to achieve wake modifications, clocked circumferentially to align with optimal timing for suitably chosen operating conditions of high aircraft noise sensitivity.

Figure 10:
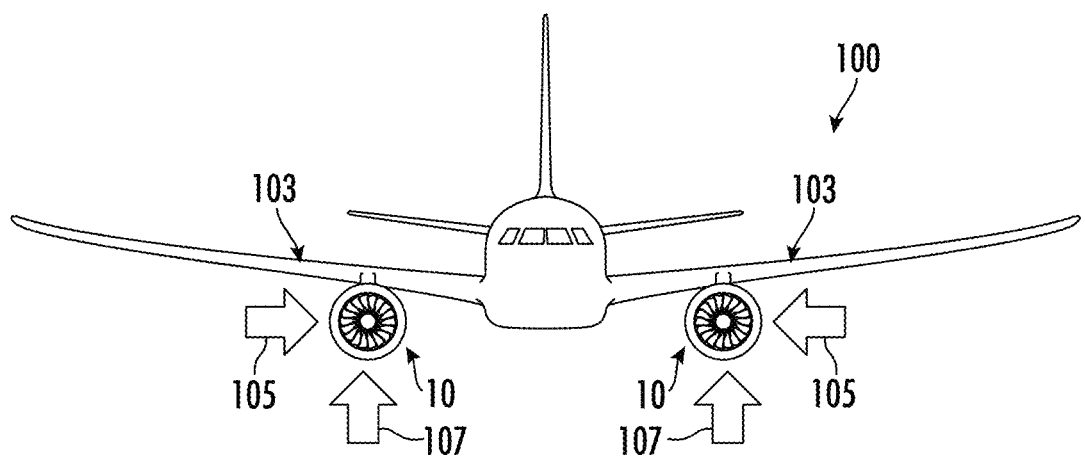
FIG. 10 illustrates a schematic diagram of an embodiment of an aircraft in accordance with aspects of the present disclosure, particularly illustrating locations of crosswind distortion and high angle-of-attack distortion acting on a gas turbine engine mounted thereto.
Figure 11:
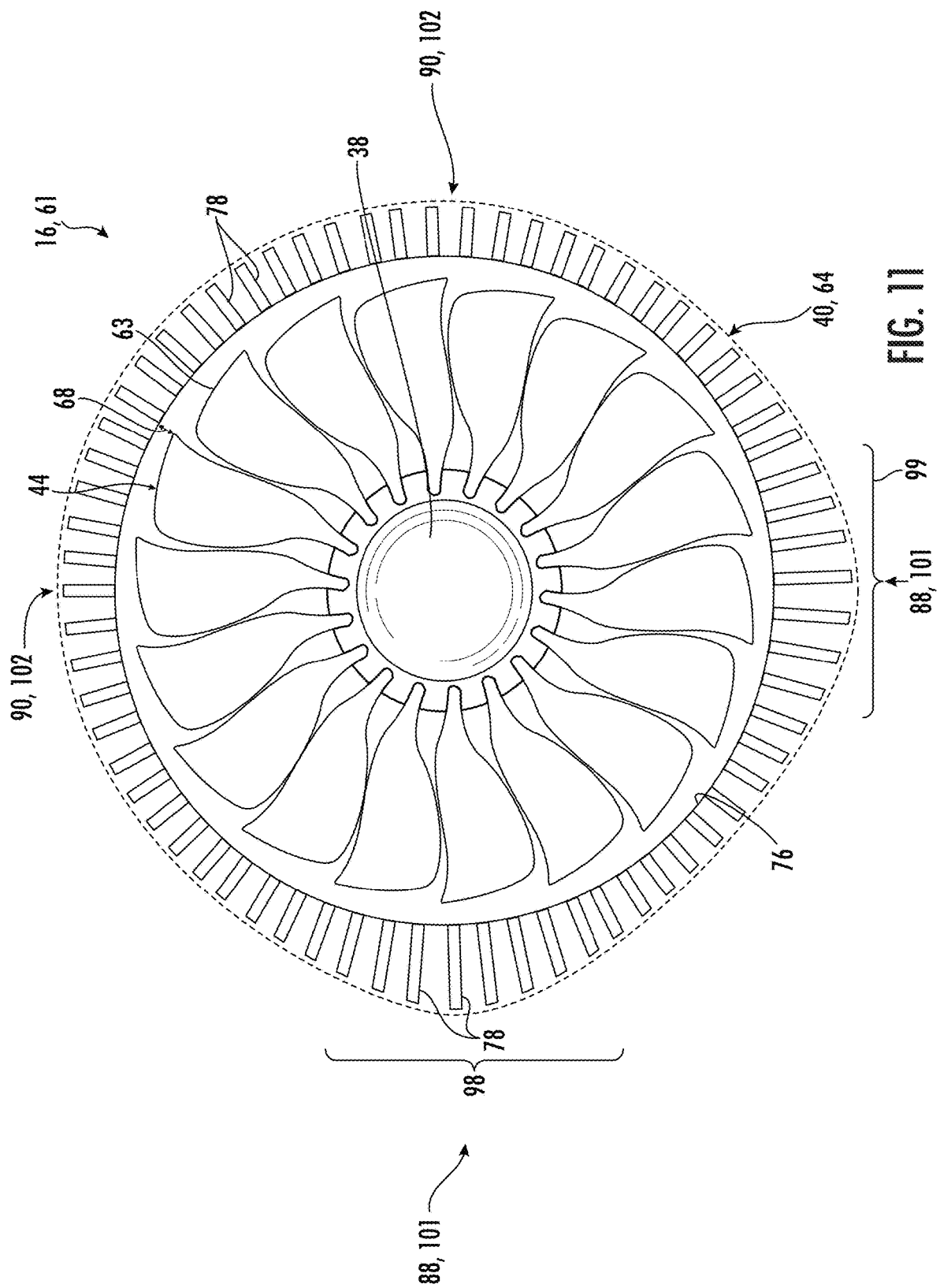
FIG. 11 illustrates a front view of another embodiment of a rotary component of a gas turbine engine including features on an interior surface of an outer casing configured to reduce fan noise.
Figure 12:
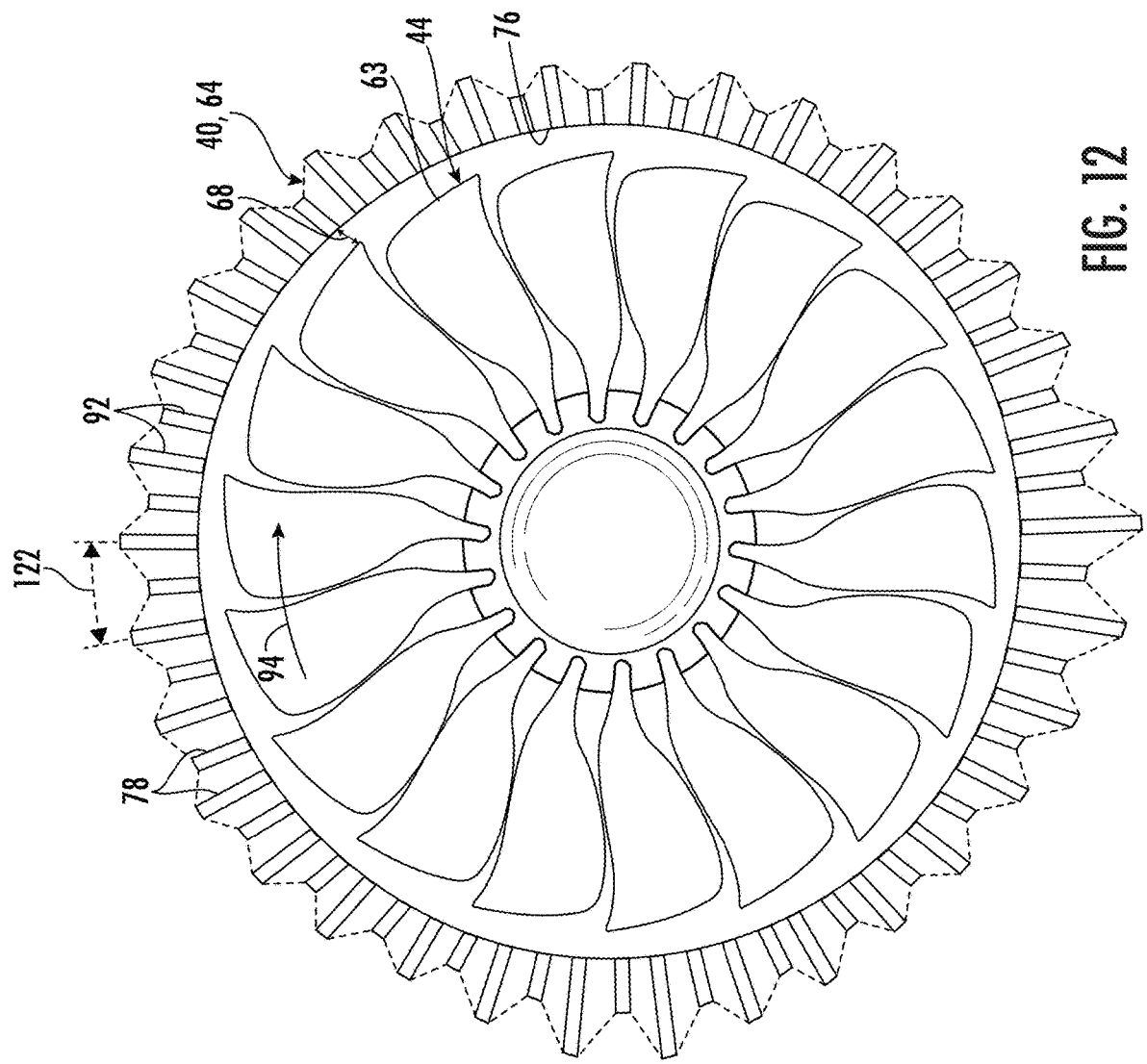
FIG. 12 illustrates a front view of still another embodiment of a rotary component of a gas turbine engine including features on an interior surface of an outer casing configured to reduce fan noise.

Referring now to FIGS. 10-12, various views of another embodiment of a rotary component, such a fan section of a gas turbine engine, according to aspects of the present disclosure is illustrated. In particular, as shown in FIG. 10, the gas turbine engine 10 may be part of an aircraft 100, such as being attached to a wing 103 of the aircraft. Moreover, as shown in FIGS. 11 and 12, the fan section 16 of the gas turbine engine 10 may include a plurality of fan blades 44 operably coupled to a rotating shaft extending along the central axis and an outer casing 64, such as fan casing 40, arranged exterior to the plurality of fan blades 44 in the radial direction. Moreover, as shown and mentioned, the outer casing 64 includes a plurality of features 78 formed into the interior surface 76 thereof. Furthermore, as shown in the illustrated embodiment, certain of the plurality of features 78 include one or more design parameters that are locally varied at one or more high distortion locations 88 where distortion leads to overloading, thereby reducing the overloading and inlet distortion/fan interaction noise of the gas turbine engine 10. As mentioned, the design parameter(s) may include, for example, blade overlap, a radial height, an axial dimension, a circumferential dimension, an orientation, relative blade position, slot type, separation distance between two adjacent features of the plurality of features, or combinations.

In such embodiments, the outer casing 64 may include a location of a first distortion level 101 on the interior surface 76 of the outer casing 64 and a location of a second distortion level 102 on the interior surface 76 of the outer casing 64. For instance, the interior surface 76 of the outer casing 64 may define a first distortion level 101 at the high distortion locations 88. Or, more particularly, the inflow distortion comes from the inlet geometry subjected to off-design conditions (e.g., crosswind, and high angle-of-attack) and the fan blades 44, including the tip leakage flows, respond to that distortion. Thus, in an embodiment, the locally modified slot geometry is generally designed to equilibrate the fan blade loading as it rotates through the distorted flow to favorably impact that response, and hence the fan performance, operability, and noise.

Similarly, the interior surface 76 of the outer casing 64 may define a second distortion level 102 at other low distortion locations 90. Or, more particularly, the airflow passing through the tip clearance gap 68 between the interior surface 76 of the outer casing 64 and the rotor blade tips 63 at the other low distortion locations 90 may define the second distortion level 102 at or upstream of the stage 70 (FIGS. 3A-3B) of the rotary component 61. It should be appreciated that the first distortion level 101 may be defined at a high distortion location 88 whereas the second distortion level 102 may be defined at a low distortion location 90. As such, the second distortion level 102 may be less than the first distortion level 101.

More particularly, as shown in FIGS. 11 and 12, the high distortion location(s) 88 may be a windward side 98 of the outer casing 64 or a keel 99 of the outer casing 64. Such locations may be selected due to crosswind distortion (as indicated by arrow 105 in FIG. 10) at the windward side 98 and/or high angle-of-attack distortion (as indicated by arrow 107 in FIG. 10) at the keel 99. Thus, at such high distortion locations 88, the design parameters, such as the radial depths, are locally varied in that the radial depths may increase up to a maximum depth at the high distortion location(s) 88. Furthermore, as shown, the plurality of features at low distortion locations 90 outside of the high distortion location(s) 88 may include uniform design parameters (such as features 78 having equal radial depths, including zero depth and greater). In particular, as shown, the low distortion locations 90 outside of the high distortion location(s) may include a crown or top of the outer casing 64, a leeward side of the outer casing 64 (i.e., the side opposite the windward side 98), and/or an entirety of the circumference of the outer casing 64.

Figure 13A:
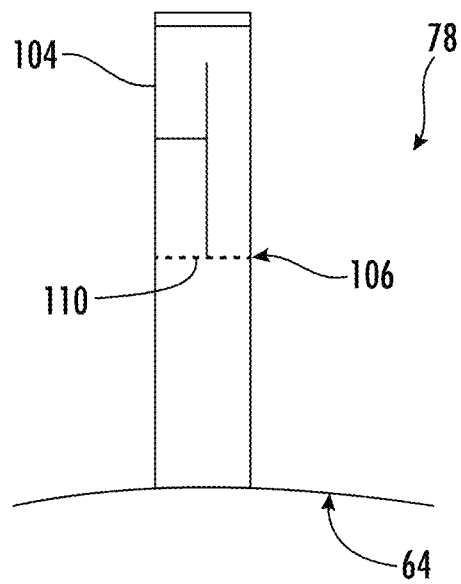
FIGS. 13A and 13B illustrate various views of still another embodiment of a feature of an outer casing of a rotary component of a gas turbine engine configured to reduce fan noise.

Referring now to FIGS. 13A-16, still further embodiments of the features 78 that may be formed into the outer casing 64 of the fan section 16 (FIG. 1) to reduce fan self-noise according to aspects of the present disclosure are illustrated. In particular, FIG. 13A illustrates a front view of one of the features 78 according to the present disclosure and FIG. 13B illustrates a side view of one of the features 78 according to the present disclosure, particularly illustrating a flow path 108 of air through the fan section 16.

Figure 13B:
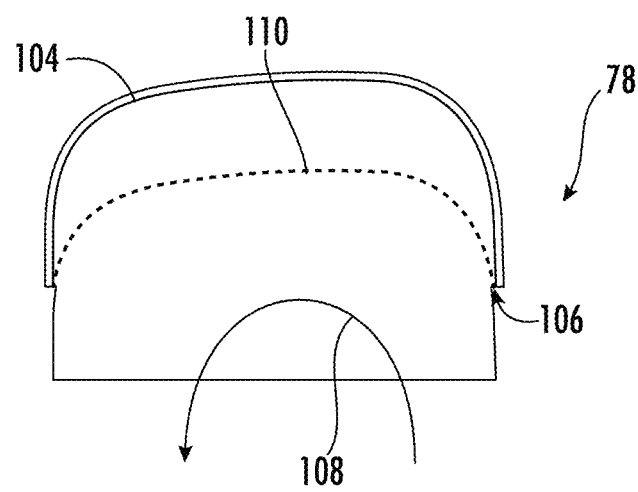

Moreover, as shown in the illustrated embodiment of FIGS. 13A and 13B, the features 78 may include an acoustic liner feature 104 integrated therein to reduce self-noise of the fan section 16. As used herein, an acoustic liner feature generally refers to a feature applied to the features 78 to intentionally attenuate or suppress noise. More specifically, as generally shown in FIGS. 13A-15B, the acoustic liner feature 104 may be defined by a separate volume (e.g., portions 114 separated from portions 116 via a resistance layer 106) in the features 78 such that the air communication to each volume is different in the porous surface to generally allow for only acoustic communication. Thus, in certain embodiments, the resistance layer 106 is represented as a dashed line at the porous interfaces in each of FIGS. 13A-15B and can be a perforated face-sheet resistance layer or a wire mesh resistance layer (as well as any other example provided herein), with the separate volume being an acoustic volume.

Figure 14A:
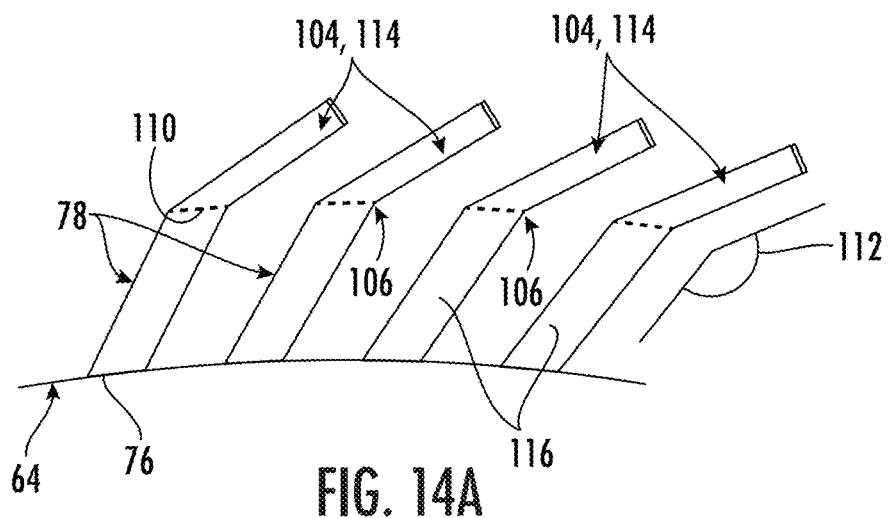
FIGS. 14A-14C illustrate various views of different embodiments of features having an acoustic liner feature integrated therein configured to reduce fan noise.

In particular embodiments, for example, as shown in FIGS. 13A, 13B, and 14A, the acoustic liner feature 104 of the plurality of features 78 may be integrated at an outer diameter 110 of the features 78. Furthermore, in an embodiment, the acoustic liner feature 104 may include a bulk absorber material, a perforated face-sheet resistance layer, a wire mesh resistance layer, a single-degree-of-freedom acoustic liner, a double-degree-of-freedom acoustic liner, a multiple-degree-of-freedom acoustic liner, or combinations thereof. As used herein, an acoustic liner generally refers to a sandwich panel constructed of a porous top layer, a honeycomb structure, and an impervious bottom layer. Thus, as used herein, single-, double-, and multi-degree-of-freedom acoustic liners generally refer to acoustic liners having a perforated sheet over a liner core of resonant chambers, with the double- and multi-degree-of-freedom acoustic liners having an additional porous mesh or perforated septa embedded within the resonant chambers of the liner core. In particular, FIG. 13A illustrates the acoustic liner feature 104 having a perforated/wire mesh resistance layer 106.

In still further embodiments, as shown in FIG. 14A, portions 114 of the features 78 containing the acoustic liner feature 104 may extend at an angle 112 with respect portions 116 of the features 78 without the acoustic liner feature 104. In particular, as shown, the angle 112 may be an obtuse angle, chosen for example so as to enable tighter packaging of the combined feature within a radially constrained nacelle volume. In other embodiments, the angle 112 may be any suitable angle ranging from 0 degrees to 180 degrees.

Figure 15B:
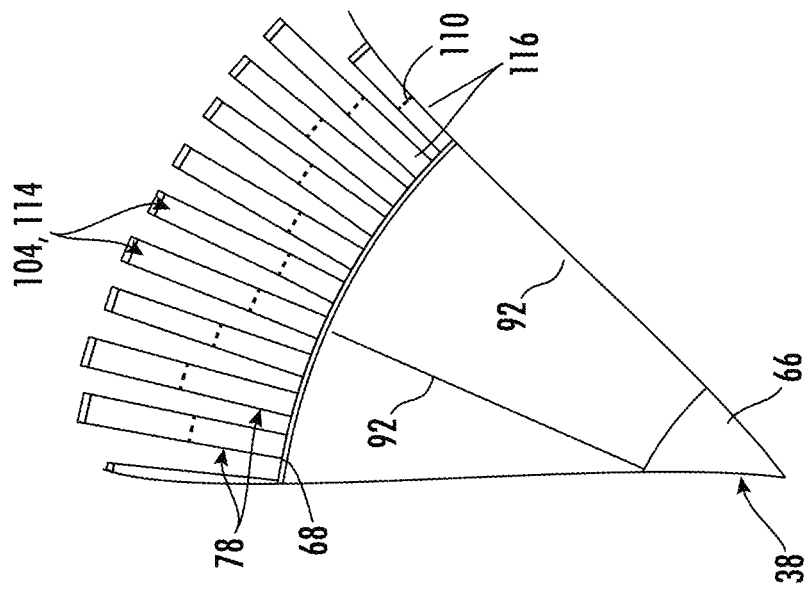
FIGS. 15A-15B illustrate partial, cross-sectional views of embodiments of a rotary component of a gas turbine engine including features on an interior surface of an outer casing configured to reduce fan noise.
Figure 15A:
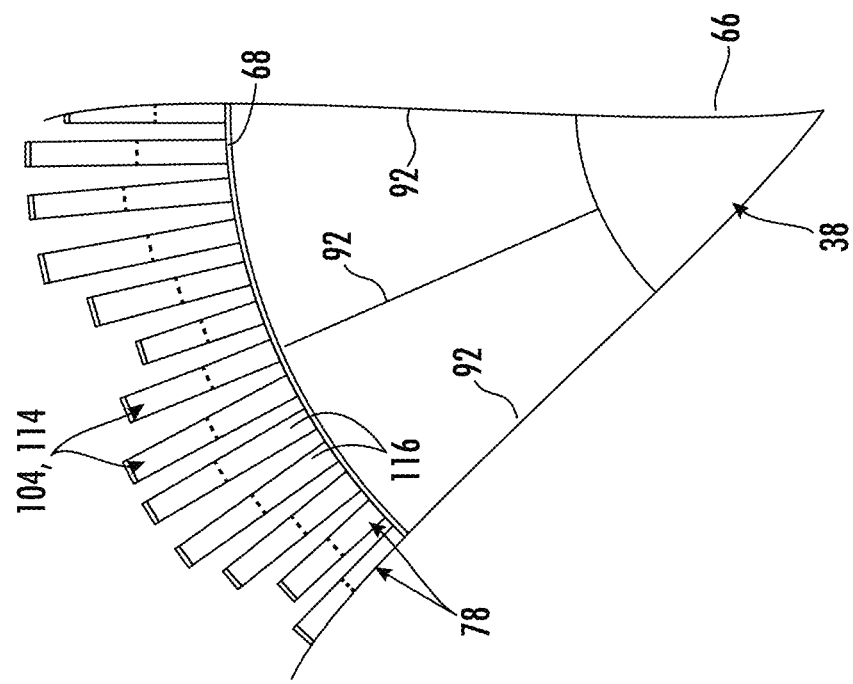

Moreover, in an embodiment, as shown in FIGS. 14A and 15A, portions 114 of the features 78 containing the acoustic liner feature 104 may be uniform (e.g., portions 114 of the features 78 containing the acoustic liner feature 104 may have equal radial depths). In addition, as shown in FIG. 14A, the portions 116 of the features 78 without the acoustic liner feature 104 may also be uniform (e.g., may have the same radial depths). In contrast, as shown in FIGS. 15A and 15B, the portions 114 of the features 78 without the acoustic liner feature 104 may be non-uniform (e.g., may have different radial depths). Furthermore, as shown, the portions 116 of the features 78 with the acoustic liner feature 104 may be non-uniform (e.g., may have different radial depths).

Figure 14B:
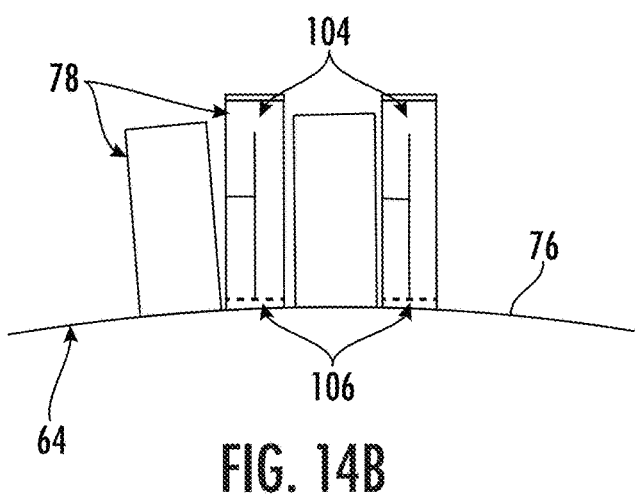
Figure 14C:
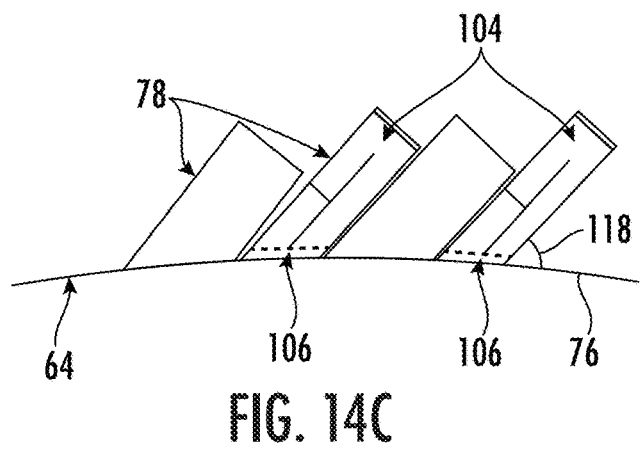

In yet another embodiment, as shown in FIGS. 14B and 14C, every other one of the features 78 may include the acoustic liner feature 104 to create an alternating configuration. Furthermore, as shown particularly in FIG. 14B, the plurality of features 78 may extend generally perpendicular within the outer casing 64 with respect to the interior surface 76. In contrast, as shown in FIG. 14C, the plurality of features 78 may be slanted (e.g., and may extend at an angle 118) within the outer casing 64 with respect to the interior surface 76 thereof such that the plurality of features 78 extend in a direction towards a rotational direction of the fan section (with the rotational direction of the fan being in the clockwise direction in FIG. 14C).

Referring now to FIG. 16, still another embodiment of one of the features 78 that may be formed into the outer casing 64 of the fan section 16 (FIG. 1) to reduce fan self-noise according to aspects of the present disclosure is illustrated. In particular, as shown, the feature 78 may be a characteristic of a circumferential groove 120, e.g., a circumferentially varying wave cycle shape with mode order kV, where k is any integer 1, 2, 3, etc. In such embodiments, as shown, the wave cycle shape of the circumferential groove 120 may be aligned with a spacing 122 of the outlet guide vanes 42 and clocked so as to align the quiet portions of the wakes with the downstream outlet guide vane leading edges to reduce fan-outer-guide-vane interaction noise.

Further aspects are provided by the subject matter of the following clauses:

A rotary component for a gas turbine engine, the rotary component comprising: a plurality of rotor blades operably coupled to a rotating shaft extending along the central axis; and an outer casing arranged exterior to the plurality of rotor blades in a radial direction of the gas turbine engine, the outer casing defining a gap between a blade tip of each of the plurality of rotor blades and the outer casing, wherein the outer casing comprises a plurality of features formed into an interior surface thereof, each of the plurality of features comprising one or more design parameters that are perturbed about a mean design parameter for stall performance so as to provide a circumferential variation in wake strengths associated with the plurality of rotor blades, thereby reducing operational noise of the gas turbine engine.

The rotary component of any preceding clause, wherein the one or more design parameters of the plurality of features are related to a periodicity of downstream guide vanes of the gas turbine engine.

The rotary component of any preceding clause, wherein the one or more design parameters of the plurality of features together define a wave pattern with a plurality of circumferential wave cycles, wherein a number of the plurality of circumferential wave cycles is equal to a multiple of the downstream guide vanes.

The rotary component of any preceding clause, wherein the wave pattern of the one or more design parameters of the plurality of features is clocked with respect to the downstream guide vanes to ensure wakes associated with quieter interaction noise impinge on leading edges of the downstream guide vanes and wakes associated with louder interaction noise pass between the downstream guide vanes for one or more noise-sensitive operating conditions.

The rotary component of any preceding clause, wherein the plurality of wave cycles of the wave pattern is selected as a function of a number of the downstream guide vanes and one or more design considerations such that blade tip loading is varied and wake shed from the plurality of rotor blades after passing the plurality of features are clocked relative to the downstream guide vanes to minimize the operational noise of the gas turbine engine.

The rotary component of any preceding clause, wherein the one or more design parameters comprising at least one of blade overlap, a radial dimension, an axial dimension, a circumferential dimension, an orientation, relative blade position, slot type, or a separation distance between two adjacent features of the plurality of features.

The rotary component of any preceding clause, wherein the plurality of features each comprise a slot or a characteristic of a circumferential groove.

The rotary component of any preceding clause, wherein the rotary component is a fan section of the gas turbine engine, and wherein the operational noise comprises fan-outlet-guide-vane interaction noise of the fan section of the gas turbine engine.

A rotary component for a gas turbine engine, the rotary component comprising: a plurality of rotor blades operably coupled to a rotating shaft extending along the central axis; and an outer casing arranged exterior to the plurality of rotor blades in a radial direction of the gas turbine engine, the outer casing defining a gap between a blade tip of each of the plurality of rotor blades and the outer casing, wherein the outer casing comprises a plurality of features formed into an interior surface thereof, and wherein each of the plurality of features comprise one or more design parameters that define a wave pattern with a plurality of wave cycles around the outer casing, wherein the plurality of wave cycles of the wave pattern is clocked to an arrangement of downstream guide vanes of the rotary component such that wakes associated with quieter interaction noise impinge on leading edges of the downstream guide vanes and wakes associated with louder interaction noise pass between the downstream guide vanes.

The rotary component of any preceding clause, wherein the plurality of features comprise a plurality of slots, and wherein a duty cycle of the wave pattern is a function of a width, shape, orientation of the plurality of slots, and a spacing between the downstream guide vanes.

The rotary component of any preceding clause, wherein the one or more design parameters comprising at least one of a radial dimension, an axial dimension, a circumferential dimension, an orientation, slot type, or separation distance between two adjacent features of the plurality of features.

The rotary component of any preceding clause, wherein the plurality of features is clocked to an array of downstream guide vanes.

The rotary component of any preceding clause, wherein the wave pattern is symmetrical.

The rotary component of any preceding clause wherein the wave pattern is asymmetrical.

A rotary component for a gas turbine engine, the rotary component comprising: a plurality of rotor blades operably coupled to a rotating shaft extending along the central axis; and an outer casing arranged exterior to the plurality of rotor blades in a radial direction of the gas turbine engine, the outer casing defining a gap between a blade tip of each of the plurality of rotor blades and the outer casing, wherein the outer casing comprises a plurality of features formed into an interior surface thereof, and wherein certain of the plurality of features comprise one or more design parameters that are locally varied at one or more distortion locations where distortion leads to overloading, thereby reducing the overloading and operational noise of the gas turbine engine.

The rotary component of any preceding clause, wherein the one or more design parameters of the plurality of features are related to a periodicity of downstream guide vanes of the gas turbine engine.

The rotary component of any preceding clause, wherein the one or more distortion locations comprise at least one of a windward side of the outer casing and/or a keel section of the outer casing.

The rotary component of any preceding clause, wherein the plurality of features at locations outside of the one or more distortion locations comprise uniform design parameters, and wherein the locations outside of the one or more distortion locations comprise at least one of a crown of the outer casing or a leeward side of the outer casing.

The rotary component of any preceding clause, wherein the rotary component is a fan section of the gas turbine engine.

The rotary component of any preceding clause, wherein the operational noise comprises at least one of inlet distortion noise and fan outlet-guide-vane (OGV) interaction noise of the fan section of the gas turbine engine.

A rotary component, comprising: a plurality of rotor blades operably coupled to a rotating shaft extending along a central axis of the rotary component; and an outer casing arranged exterior to the plurality of rotor blades in a radial direction of the rotary component, the outer casing defining a gap between a blade tip of each of the plurality of rotor blades and the outer casing, wherein the outer casing comprises a plurality of features formed into an interior surface thereof, and wherein at least one feature of the plurality of features is a slot having an acoustic liner feature integrated therein to reduce operational noise of the rotary component.

The rotary component of any preceding claim, wherein the at least one feature comprising the acoustic liner feature is related to a periodicity of one or more downstream guide vanes.

The rotary component of any preceding claim, wherein each of the plurality of features comprises one or more design parameters that together define a wave pattern with a plurality of circumferential wave cycles, wherein a number of the plurality of circumferential wave cycles is equal to a multiple of the downstream guide vanes.

The rotary component of any preceding claim, wherein the at least one feature comprising the acoustic liner feature is independent of a periodicity of one or more downstream guide vanes.

The rotary component of any preceding claim, wherein the acoustic liner feature of the at least one feature is integrated at an outer diameter thereof.

The rotary component of any preceding claim, wherein a portion of the at least one feature comprising the acoustic liner feature extends at an angle with respect to another portion of the at least one feature without the acoustic liner feature.

The rotary component of any preceding claim, wherein the one or more design parameters of a portion of the at least one feature comprising the acoustic liner feature are uniform and the one or more design parameters of another portion of the at least one feature without the acoustic liner feature is non-uniform.

The rotary component of any preceding claim, wherein the one or more design parameters of a portion of the at least one feature comprising the acoustic liner feature and another portion of the at least one feature without the acoustic liner feature are non-uniform.

The rotary component of any preceding claim, wherein the one or more design parameters comprise at least one of a blade overlap, radial height, an axial dimension, a circumferential dimension, an orientation, relative blade position, slot type, or separation distance from an adjacent feature.

The rotary component of any preceding claim, wherein every other of the plurality of features comprises the acoustic liner feature to create an alternating configuration of features with and without the acoustic liner feature.

The rotary component of any preceding claim, wherein the plurality of features extend generally perpendicular within the outer casing with respect to the interior surface thereof.

The rotary component of any preceding claim, wherein the acoustic liner feature comprises at least one of a bulk acoustic liner feature, a perforated material, a wire mesh resistance layer, a single-degree-of-freedom acoustic liner, a double-degree-of-freedom acoustic liner, a multiple-degree-of-freedom acoustic liner, or combinations thereof.

The rotary component of any preceding claim, wherein the at least one feature has a maximum depth on a windward side or a keel of the outer casing.

The rotary component of any preceding claim, wherein the rotary component is a fan section of a gas turbine engine.

The rotary component of any preceding claim, wherein the plurality of features extend at an angle within the outer casing with respect to the interior surface thereof such that the plurality of features extend in a direction towards a rotational direction of the fan section.

The rotary component of any preceding claim, wherein the operational noise comprises fan self-noise of the fan section.

A fan section, comprising: a plurality of fan blades operably coupled to a rotating shaft extending along a central axis of the fan section; and an outer casing arranged exterior to the plurality of fan blades in a radial direction of the fan section, the outer casing defining a gap between a blade tip of each of the plurality of fan blades and the outer casing, wherein the outer casing comprises at least one feature formed into an interior surface thereof, and wherein the at least one feature comprises an acoustic liner feature integrated therein to reduce fan self-noise of the fan section.

A fan section, comprising: a plurality of fan blades operably coupled to a rotating shaft extending along a central axis of the fan section; and an outer casing arranged exterior to the plurality of fan blades in a radial direction of the fan section, the outer casing defining a gap between a blade tip of each of the plurality of fan blades and the outer casing, wherein the outer casing comprises a plurality of features formed into an interior surface thereof, the plurality of features comprising one of a slot or a circumferential groove, wherein the plurality of features comprises one or more design parameters that together define a wave pattern with a plurality of circumferential wave cycles, wherein a number of the plurality of circumferential wave cycles is equal to a multiple of outlet guide vanes of the fan section to reduce fan-outlet-guide-vane (OGV) interaction noise of the fan section, and wherein at least one of the plurality of features comprises an acoustic liner feature integrated therein to reduce fan self-noise of the fan section.

The fan section of any preceding claim, wherein the design parameters are locally varied at one or more high distortion locations where distortion causes overloading, thereby reducing the overloading and operational noise of the fan section.

The fan section of any preceding claim, wherein the one or more distortion locations comprise at least one of a windward side of the outer casing and/or a keel section of the outer casing.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A rotary component for a gas turbine engine, the rotary component comprising:
   a plurality of rotor blades operably coupled to a rotating shaft; and
   an outer casing arranged radially outward to the plurality of rotor blades, the outer casing defining a gap between a blade tip of each of the plurality of rotor blades and the outer casing,
   wherein the outer casing comprises a plurality of features formed into an interior surface thereof, each of the plurality of features comprising one or more design parameters that are perturbed about a mean design parameter for stall performance so as to provide a circumferential variation in wake strengths associated with the plurality of rotor blades, wherein the plurality of features include a plurality of circumferential grooves, wherein a depth of each of the plurality of circumferential grooves is varied, wherein the one or more design parameters of the plurality of features are related to a periodicity of downstream guide vanes of the gas turbine engine, wherein the one or more design parameters of the plurality of features together define a wave pattern with a plurality of circumferential wave cycles, and wherein a number of the plurality of circumferential wave cycles is equal to a multiple of the downstream guide vanes.

2. The rotary component of claim 1, wherein the wave pattern of the one or more design parameters of the plurality of features is clocked with respect to the downstream guide vanes to ensure wakes associated with quieter interaction noise impinge on leading edges of the downstream guide vanes and wakes associated with louder interaction noise pass between the downstream guide vanes for one or more noise-sensitive operating conditions.

3. The rotary component of claim 2, wherein the plurality of circumferential wave cycles of the wave pattern is selected as a function of a number of the downstream guide vanes and one or more design considerations such that blade tip loading is varied and wake shed from the plurality of rotor blades after passing the plurality of features are clocked relative to the downstream guide vanes to minimize an operational noise of the gas turbine engine.

4. The rotary component of claim 1, wherein the one or more design parameters comprise a blade overlap, a radial dimension, an axial dimension, a circumferential dimension, an orientation, a relative blade position, a slot type, or a separation distance between two adjacent features of the plurality of features.

5. The rotary component of claim 1, wherein the depth of each of the plurality of circumferential grooves is varied to be aligned with a spacing between outlet guide vanes.

6. The rotary component of claim 1, wherein the rotary component is a fan section of the gas turbine engine, and wherein an operational noise comprises fan-outlet-guide-vane interaction noise of the fan section of the gas turbine engine.

7. A rotary component for a gas turbine engine, the rotary component comprising:
   a plurality of rotor blades operably coupled to a rotating shaft; and an outer casing arranged radially outward to the plurality of rotor blades, the outer casing defining a gap between a blade tip of each of the plurality of rotor blades and the outer casing, wherein the outer casing comprises a plurality of features formed into an interior surface thereof, wherein the plurality of features include a plurality of circumferential grooves, and wherein a depth of each of the plurality of circumferential grooves is varied to be aligned with a spacing between outlet guide vanes such that wakes associated with less interaction noise impinge on leading edges of the outlet guide vanes and wakes associated with greater interaction noise pass between the outlet guide vanes.

8. The rotary component of claim 7, wherein each of the plurality of features comprise one or more design parameters that together define a wave pattern with a plurality of circumferential wave cycles around the outer casing.

9. The rotary component of claim 8, wherein the one or more design parameters comprise a radial dimension, an axial dimension, a circumferential dimension, an orientation, a slot type, or a separation distance between two adjacent features of the plurality of features.

10. The rotary component of claim 8, wherein the plurality of features is clocked to an array of the outlet guide vanes.

11. The rotary component of claim 8, wherein the wave pattern is symmetrical.

12. The rotary component of claim 8, wherein the wave pattern is asymmetrical.

* * * * *